United States Patent
Ide

(10) Patent No.: US 6,741,772 B2
(45) Date of Patent: May 25, 2004

(54) OPTICAL MULTIPLEXER/DEMULTIPLEXER AND WAVEGUIDE TYPE OPTICAL COUPLER

(75) Inventor: Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 52 days.

(21) Appl. No.: 10/126,311

(22) Filed: Apr. 22, 2002

(65) Prior Publication Data

US 2003/0118284 A1 Jun. 26, 2003

(30) Foreign Application Priority Data

Dec. 20, 2001 (JP) .................................. 2001-387095

(51) Int. Cl.$^7$ .................................................. G02B 6/34
(52) U.S. Cl. ............................................. 385/37; 385/14
(58) Field of Search ............................. 385/37, 24, 14, 385/31; 398/84, 87

(56) References Cited

U.S. PATENT DOCUMENTS

| | | | | |
|---|---|---|---|---|
| 6,058,233 A | * | 5/2000 | Dragone | 385/46 |
| 6,067,388 A | * | 5/2000 | Fabricius et al. | 385/14 |
| 6,069,990 A | * | 5/2000 | Okawa et al. | 385/43 |
| 6,195,481 B1 | * | 2/2001 | Nakajima et al. | 385/24 |
| 6,301,409 B1 | * | 10/2001 | Whiteaway et al. | 385/37 |
| 6,389,201 B1 | * | 5/2002 | Urino | 385/43 |
| 2002/0064339 A1 | * | 5/2002 | Chiba | 385/24 |
| 2002/0159696 A1 | * | 10/2002 | Yamauchi et al. | 385/37 |

* cited by examiner

Primary Examiner—David V. Bruce
Assistant Examiner—Thomas R Artman
(74) Attorney, Agent, or Firm—Staas & Halsey LLP

(57) ABSTRACT

An optical multiplexer/demultiplexer that the passband characteristic of demultiplexed optical signal in a waveguide on the output side can be controlled accurately. Long and narrow guide waveguides, being areas where an effective refractive index is greater than an effective refractive index of a sector slab waveguide on the input side, are formed in the core or in an area adjacent to the core so that the long and narrow guide waveguides will branch at the center of curvature of the sector slab waveguide and so that the long and narrow guide waveguides will extend in an output direction without intersecting with one another. When optical signal is input to the sector slab waveguide, the light is guided more strongly through areas where the guide waveguides are formed. As a result, with the propagation of the optical signal, a peak corresponding to the shape of the guide waveguides will appear in the shape of a mode of the optical signal. Therefore, the shape of a mode of optical signal which propagates can be controlled accurately according to a passband characteristic needed in an optical output waveguide.

14 Claims, 21 Drawing Sheets

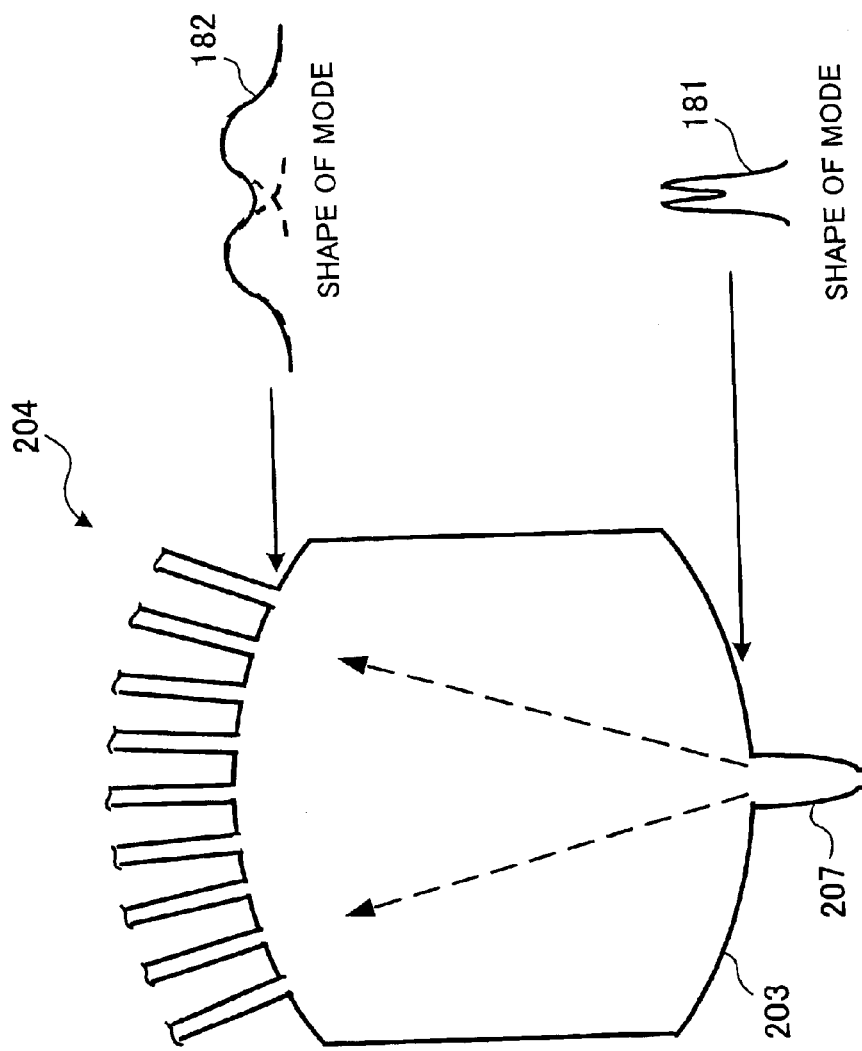

OPTICAL MULTIPLEXER/DEMULTIPLEXER AND WAVEGUIDE TYPE OPTICAL COUPLER

BACKGROUND OF THE INVENTION (1) Field of the Invention

This invention relates to an optical multiplexer/demultiplexer including an arrayed waveguide grating and a waveguide type optical coupler including a sector slab waveguide.

(2) Description of the Related Art

With an explosive increase in data traffic on networks, in recent years attention has been riveted to photonic networks on which a large amount of data can be transferred. To realize such networks, wavelength division multiplexing (WDM) optical communication networks are being built. An arrayed waveguide grating (AWG) in which the technology of a planar lightwave circuit (PLC) is adopted is a likely candidate for an optical wavelength multiplexer/demultiplexer essential to these WDM transmission systems.

FIG. 17 is a view showing the structure of a conventional arrayed waveguide grating.

As shown in FIG. 17, an arrayed waveguide grating 200 has the following waveguide structure. A sectors lab waveguide 203 is connected to the output side of one or more optical input waveguides 202 arranged via a mode conversion waveguide 207 described later. An arrayed waveguide 204 is connected to the input side of the sector slab waveguide 203. A sector slab waveguide 205 is connected to the output side of the arrayed waveguide 204. A plurality of optical output waveguides 206 are connected to the output side of the sector slab waveguide 205. Usually the arrayed waveguide grating 200 is made by forming the above waveguide structure on, for example, a silicon substrate with cores made from, for example, siliceous glass.

The sector slab waveguide 203 on the input side has the center of curvature at the end of the middle waveguide of the optical input waveguides 202. The sector slab waveguide 205 on the output side also has the center of curvature at the end of the middle waveguide of optical output waveguides 206. The sector slab waveguides 203 and 205 have a structure in which the optic axes of waveguides in the arrayed waveguides 204 are located radially from the center of curvature. As a result, the optical arrangement of the sector slab waveguide 203 and arrayed waveguides 204 and of the sector slab waveguide 205 and arrayed waveguides 204 are the same as that of a concave mirror. That is to say, they will function the same as a lens. Moreover, in the arrayed waveguides 204, there is optical path difference ΔL between any two adjacent waveguides.

If the arrayed waveguide grating 200 functions as an optical demultiplexer, optical signal with a plurality of wavelengths is multiplexed by a WDM system and is input from the optical input waveguides 202 to the sector slab waveguide 203 via the mode conversion waveguide 207. This wavelength-multiplexed optical signal spreads in the sector slab waveguide 203 by diffraction and is spreaded to each of the waveguides in the arrayed waveguide 204. In this case, the phases of optical signal spreaded to the waveguides in the arrayed waveguide 204 are the same.

The optical signal beams which propagated through the arrayed waveguide 204 are given phase difference corresponding to optical path difference ΔL between adjacent waveguides, interfere with one another in the sector slab waveguide 205 on the output side, and are condensed into the optical output waveguides 206. In this case, phase difference given in the arrayed waveguide 204 depends on wavelengths, so the optical signal beams are condensed into the different optical output waveguides 206 according to their wavelengths. As a result, the wavelength-multiplexed optical signal input from the optical input waveguides 202 is demultiplexed according to wavelengths and is output from the different optical output waveguides 206.

Operation in the arrayed waveguide grating 200 is reversible. That is to say, if the direction in which optical signal travels is inverted, the arrayed waveguide grating 200 will function as an optical multiplexer. Moreover, for example, the sector slab waveguide 203 alone can be used. In this case, the sector slab waveguide 203 will function as an optical coupler for spreading optical signal input from the optical input waveguides 202 into a plurality of optical output waveguides connected to its exit.

For example, the number of the optical input waveguides 202 and optical output waveguides 206 located corresponds to that of signal light beams with different wavelengths which are obtained as a result of demultiplexing by the arrayed waveguide grating 200 or which are to be multiplexed by the arrayed waveguide grating 200. Moreover, usually the arrayed waveguide 204 includes a large number of waveguides. In FIG. 17, for the sake of simplicity, only one optical input waveguide 202 is shown and the number of waveguides included in the arrayed waveguides 204 and optical output waveguide 206 is reduced.

By the way, if the arrayed waveguide grating 200 is used as an optical demultiplexer, the passband characteristic of optical signal obtained in each optical output waveguide 206 are as follows. The intensity of optical signal obtained in each optical output waveguide 206 is the highest at center wavelength λ0 and becomes significantly lower at a wavelength farther from the center wavelength λ0. In actual optical communication systems, however, the passband characteristic of propagated signal must be flat with, for example, fluctuations in the wavelength of the light taken into consideration so that the intensity of the signal will be constant in a moderately wide wavelength range with the center wavelength λ0 as its center. In the conventional arrayed waveguide grating 200, therefore, the mode conversion waveguide 207 is located between the optical input waveguides 202 and sector slab waveguide 203.

FIG. 18 is an enlarged view of portions around the mode conversion waveguide 207. In FIG. 18, the shape of modes of optical signal propagating through the sector slab waveguide 203 is also shown.

As shown in FIG. 18, the mode conversion waveguide 207 is a waveguide in the shape of a paraboloid in which the width of a core widens in the direction of the exit, and connects the exit of the optical input waveguides 202 and the entrance of the sector slab waveguide 203. The mode conversion waveguide 207 includes a core in the shape of a paraboloid, so optical signal as shown by a curve 181, the shape of a mode of which has two peaks, will be output to the sector slab waveguide 203. When this optical signal propagates through the sector slab waveguide 203, the width of the shape of its mode will widen. At this time the shape of its mode can be shown by a curve 182. Then the optical signal is input to the arrayed waveguide 204.

Now, the principles underlying flattening a passband characteristic by locating the mode conversion waveguide 207 will be described with reference to FIGS. 19 and 20.

FIGS. 19(A) and 19(B) are schematic views showing how optical signal output from the mode conversion waveguide 207 propagates through the arrayed waveguide grating 200. FIG. 19(A) shows how optical signal output from the mode conversion waveguide 207 propagates through portions around the sector slab waveguide 203 on the input side. FIG. 19(B) shows how optical signal output from the mode conversion waveguide 207 propagates through portions around the sector slab waveguide 205 on the output side.

In FIGS. 19(A) and 19(B), peaks P1 and P2 appear in the shape of a mode of optical signal with a wavelength of $\lambda 1$ which propagated through the optical input waveguides 202, on which a mode conversion was performed in the mode conversion waveguide 207, and which was output to the sector slab waveguide 203. The peaks P1 and P2 are input to the arrayed waveguide 204 at different positions at the exit of the sector slab waveguide 203. Therefore, after the peaks P1 and P2 are input to the sector slab waveguide 205 on the output side via the arrayed waveguide 204, they will converge at different positions X1 and X2, respectively, at the exit of the sector slab waveguide 205 shown in FIG. 19(B).

It is assumed that there is optical signal with a wavelength of $\lambda 2$ different from the above optical signal and that after the optical signal with a wavelength of $\lambda 2$ is input to the optical input waveguides 202 and then is output from the mode conversion waveguide 207, peaks Q1 and Q2 (not shown) appear in the shape of its mode. In this case, the peaks Q1 and Q2 will converge at different positions Y1 and Y2, respectively, at the exit of the sector slab waveguide 205 on the output side. Phase difference given by the arrayed waveguide 204 depends on wavelengths, so Y1 and Y2 are different from X1 and X2 respectively.

FIG. 20 is a graph for describing the passband characteristic of optical signal in the optical output waveguide 206.

A case where structural parameters are selected so that the position X1 where the peak P1 included in the optical signal with a wavelength of $\lambda 1$ converges matches the position Y2 where the peak Q2 included in the optical signal with a wavelength of $\lambda 2$ converges, that is to say, so that the peak P1 included in the optical signal with a wavelength of $\lambda 1$ and the peak Q2 included in the optical signal with a wavelength of $\lambda 2$ are input to the same waveguide in the optical output waveguide 206 will now be described. It is assumed that the passband characteristics of the peaks P1 and Q2 are given by curves 211 and 212, respectively, in FIG. 20. Then the passband characteristic of optical signal in this waveguide can be obtained by adding together the passband characteristics of the peaks P1 and Q2. This passband characteristic shown by a curve 213 indicates that the shape of a spectrum is flat in a wavelength range of from the wavelength corresponding to the peak P1 to the wavelength corresponding to the peak Q2.

If structural parameters for the arrayed waveguide grating 200 are selected properly according to a passband characteristic needed, the shape of a spectrum can be made flat in a necessary wavelength range on the above principles.

In the above mode conversion waveguide 207, however, single mode light which propagates through the optical input waveguides 202 merely branches and peaks which appear in the shape of modes of two optical beams are added together to obtain a passband characteristic on the output side. Therefore, the intensity of optical signal cannot be controlled accurately. For example, proper control which reduces cross talk in each of waveguides in the optical output waveguide 206 cannot be exercised.

FIG. 21 is a graph of passband characteristics for describing how cross talk occurs.

As shown in FIG. 21, a spectrum which is flat in a demultiplexed wavelength range in each waveguide as a center wavelength will appear in a passband characteristic obtained in the optical output waveguide 206. When a spectrum corresponding to an adjacent wavelength appears in a flat portion, cross talk will occur in this portion. Therefore, the shape of a spectrum in which the intensity of optical signal lowers sharply outside a necessary wavelength range is desirable as a passband characteristic in each waveguide.

With the above conventional structure in which the mode conversion waveguide 207 is located at the exit of the optical input waveguides 202, however, the shape of a spectrum will spread with the expansion of a flat passband, resulting in a wider cutoff region. Therefore, the passbands of adjacent wavelengths come near to each other and the spectra overlap considerably. As a result, much cross talk will occur.

As stated above, with the conventional arrayed waveguide grating 200 in which the mode conversion waveguide 207 is used, the shape of a mode of optical signal which propagates to the exit of the sector slab waveguide 203 on the input side depends on the shape of a mode of the optical input waveguides 202, so it is impossible to accurately control the shape of a mode of light generated in the sector slab waveguide 203 according to a passband characteristic needed in the optical output waveguide 206.

Moreover, if the sector slab waveguide 203 on the input side is used as an optical coupler, optical signal propagated to each waveguide connected to its exit must be uniform in intensity. Therefore, accurate control must be exercised over the shape of a mode of optical signal which propagates through the sector slab waveguide 203, but this is impossible.

SUMMARY OF THE INVENTION

The present invention was made under the background circumstances as described above. An object of the present invention is to provide an optical multiplexer/demultiplexer which can exercise accurate control over the passband characteristic of demultiplexed optical signal in a waveguide on the output side.

Another object of the present invention is to provide a waveguide type optical coupler which can exercise proper control over the shape of a mode of output optial signal.

In order to achieve the first object, an optical multiplexer/demultiplexer in which a waveguide structure comprising one or more optical input waveguides arranged, a first sector slab waveguide connected to the output side of the optical input waveguides, arrayed waveguides connected to the output side of the first sector slab waveguide and including a plurality of waveguides arranged any two adjacent waveguides of which differ in length by a constant value for propagating output optical signal, a second sector slab waveguide connected to the output side of the arrayed waveguides, and a plurality of optical output waveguides arranged and connected to the output side of the second sector slab waveguide is formed on a substrate is provided. A plurality of long and narrow guide waveguides, being areas where an effective refractive index is greater than an effective refractive index of the first sector slab waveguide, are formed in an area adjacent to the first sector slab waveguide in this optical multiplexer/demultiplexer so that the plurality of long and narrow guide waveguides will branch at the center of curvature of the first sector slab waveguide and so that the plurality of long and narrow guide waveguides will extend in an output direction without intersecting with one another.

Moreover, in order to achieve the second object of the present invention, a waveguide type optical coupler comprising a sector slab waveguide that spreads optical signal input from one or more optical input waveguides arranged and connected to the entrance of the sector slab waveguide to a plurality of optical output waveguides arranged and connected to the output side of the sector slab waveguide is provided. A plurality of long and narrow guide waveguides, being areas where an effective refractive index is greater than an effective refractive index of the sector slab waveguide, are formed in the core or in an area adjacent to the sector slab waveguide in this waveguide type optical coupler so that the plurality of long and narrow guide waveguides will branch at the center of curvature of the sector slab waveguide and so that the plurality of long and narrow guide waveguides will extend in an output direction without intersecting with one another.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 18 is an enlarged view of portions around a mode conversion waveguide.

DESCRIPTION OF THE PREFERRED EMBODIMENTS

Embodiments of the present invention will now be described with reference to the drawings.

Figure 2:
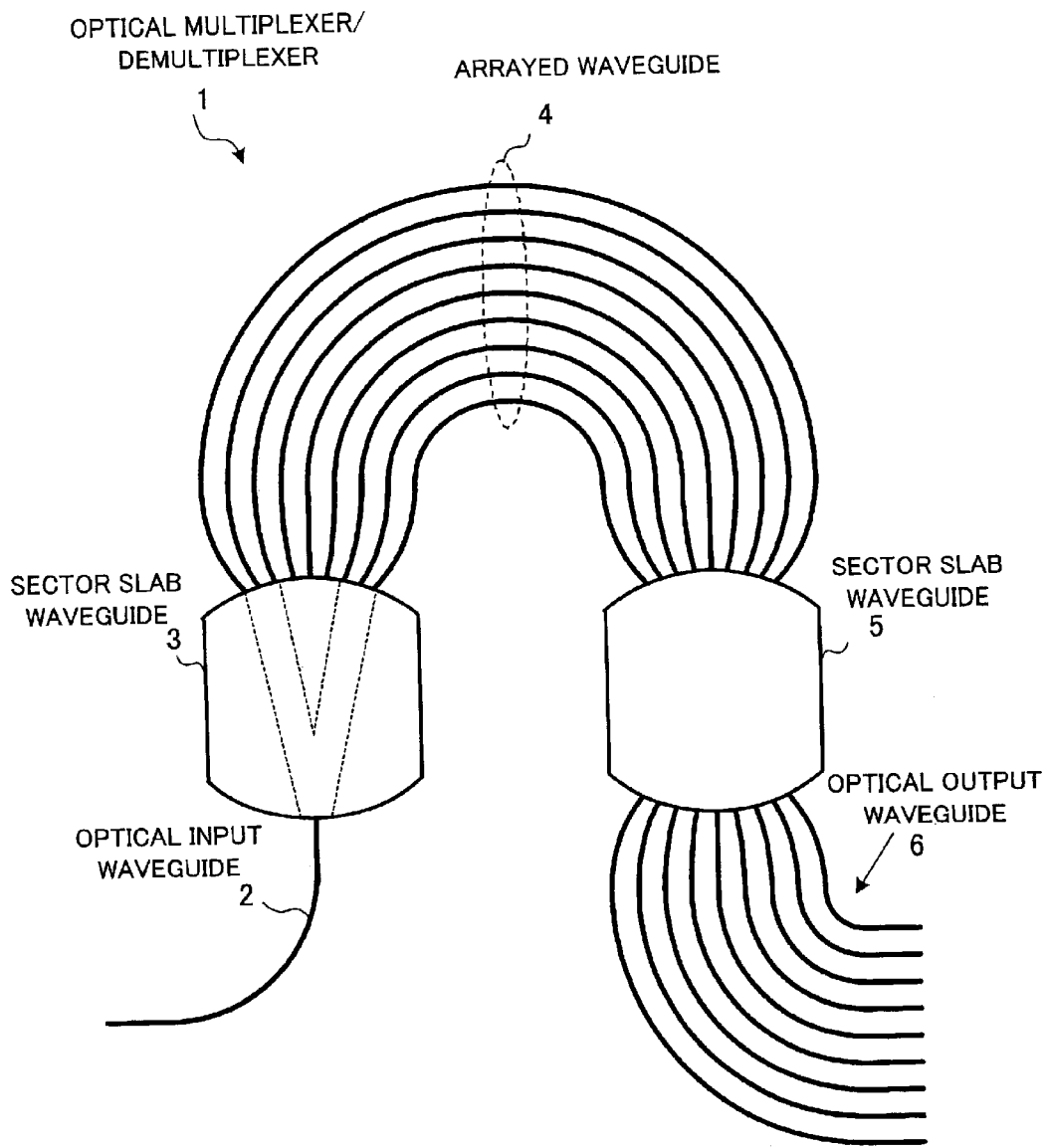
FIG. 2 is a plan view showing the entire structure of an optical multiplexer/demultiplexer according to the present invention.

FIG. 2 is a plan view showing the entire structure of an optical multiplexer/demultiplexer according to the present invention.

As shown in FIG. 2, an optical multiplexer/demultiplexer 1 according to the present invention basically comprises an arrayed waveguide grating having a waveguide structure including one or more optical input waveguides 2 arranged, a sector slab waveguide 3 located on the output side of the optical input waveguides 2, arrayed waveguides 4 connected to the output side of the sector slab waveguide 3, a sector slab waveguide 5 connected to the output side of the arrayed waveguide 4, and a plurality of optical output waveguides 6 connected to the output side of the sector slab waveguide 5. This waveguide structure is realized by, for example, forming a core on a substrate made from silicon or the like with siliceous glass or the like.

If optical signal with a plurality of wavelengths is multiplexed and is input via the optical input waveguide 2, then the optical multiplexer/demultiplexer 1 will function as an optical demultiplexer which demultiplexes this optical signal and which outputs optical signal with each wavelength to each waveguide of the optical output waveguides 6. In addition, operation in the optical multiplexer/demultiplexer 1 is reversible. That is to say, if the direction in which optical signal travels is inverted, the optical multiplexer/demultiplexer 1 will function as an optical multiplexer.

The sector slab waveguide 3 on the input side has the center of curvature at the end of the middle waveguide of the optical input waveguides 2. The sector slab waveguide 5 on the output side also has the center of curvature at the end of the middle waveguide of optical output waveguides 6. The sector slab waveguides 3 and 5 have a structure in which the optic axes of waveguides in the arrayed waveguides 4 are located radially from the center of curvature. As a result, the optical arrangements of the sector slab waveguide 3 and arrayed waveguide 4 and of the sector slab waveguide 5 and arrayed waveguide 4 are the same as that of a concave mirror. That is to say, they will function the same as a lens. Moreover, in the arrayed waveguides 4, there is optical path difference ΔL between adjacent waveguides.

For example, the number of the optical input waveguides 2 and optical output waveguides 6 located corresponds to that of optical signal beams with different wavelengths which are obtained as a result of demultiplexing by the optical multiplexer/demultiplexer 1 or which are to be multiplexed by the optical multiplexer/demultiplexer 1. Moreover, usually the arrayed waveguide 4 includes a large number of waveguides. In FIG. 2, for the sake of simplicity, only one optical input waveguide 202 is shown and the number of waveguides included in the arrayed waveguides 4 and optical output waveguides 6 is reduced.

If the optical multiplexer/demultiplexer 1 functions as an optical demultiplexer, basic operation is as follows. Wavelength-multiplexed optical signal input to the sector slab waveguide 3 via the optical input waveguide 2 spreads in the sector slab waveguide 3 by diffraction and is spreaded to each of the waveguides in the arrayed waveguide 4. In this case, the phases of optical signal spreaded to the waveguides are the same. The optical signal beams which propagate through the arrayed waveguides 4 are given phase difference corresponding to optical path difference ΔL between adjacent waveguides, interfere with one another in the sector slab waveguide 5 on the output side, and are condensed into the optical output waveguides 6. In this case, phase difference given in the arrayed waveguide 4 depends on wavelengths, so the optical signal beams are condensed into the different optical output waveguides 6 according to their wavelengths. As a result, the wavelength-multiplexed optical signal input from the optical input waveguide 2 is demultiplexed according to wavelengths and is output from the different optical output waveguides 6.

By the way, in actual optical communication systems in which the above optical multiplexer/demultiplexer 1 is used, a moderately wide wavelength range with a center wavelength as its center will be used for optical signal with a certain wavelength. Moreover, in many cases, there occur fluctuations in the wavelength of optical signal propagated. Therefore, it is desirable that the transmitted spectrum of optical signal obtained in the optical output waveguides 6 has a flat passband characteristic in a wavelength range around a center wavelength. Furthermore, to reduce cross talk caused by an adjacent wavelength, for example, it is desirable that the intensity of optical signal lowers sharply at both edges of a flat portion in a passband characteristic.

To obtain such a proper passband characteristic, the shape of a mode of optical signal which propagates through the sector slab waveguide 5 on the output side must be controlled accurately. This means that the shape of a mode of optical signal which propagates through the sector slab waveguide 3 on the input side must be controlled accurately. Therefore, in the present invention, a plurality of guide waveguides which guide optical signal more strongly are formed in the sector slab waveguide 3 on the input side.

These guide waveguides, being areas where an effective refractive index is greater than an effective refractive index of the sector slab waveguide 3, are formed in an area adjacent to the sector slab waveguide. These areas are formed like a belt so that they will branch at the center of curvature of the sector slab waveguide 3 and so that they extend in an output direction without intersecting with each other. As a result, optical signal input from the optical input waveguide 2 propagates through the core to the exit. In addition, the optical signal propagates more strongly through the guide waveguide areas, so the shape of a mode of the optical signal propagating will gradually change according to the shape of the guide waveguides.

Figure 1:
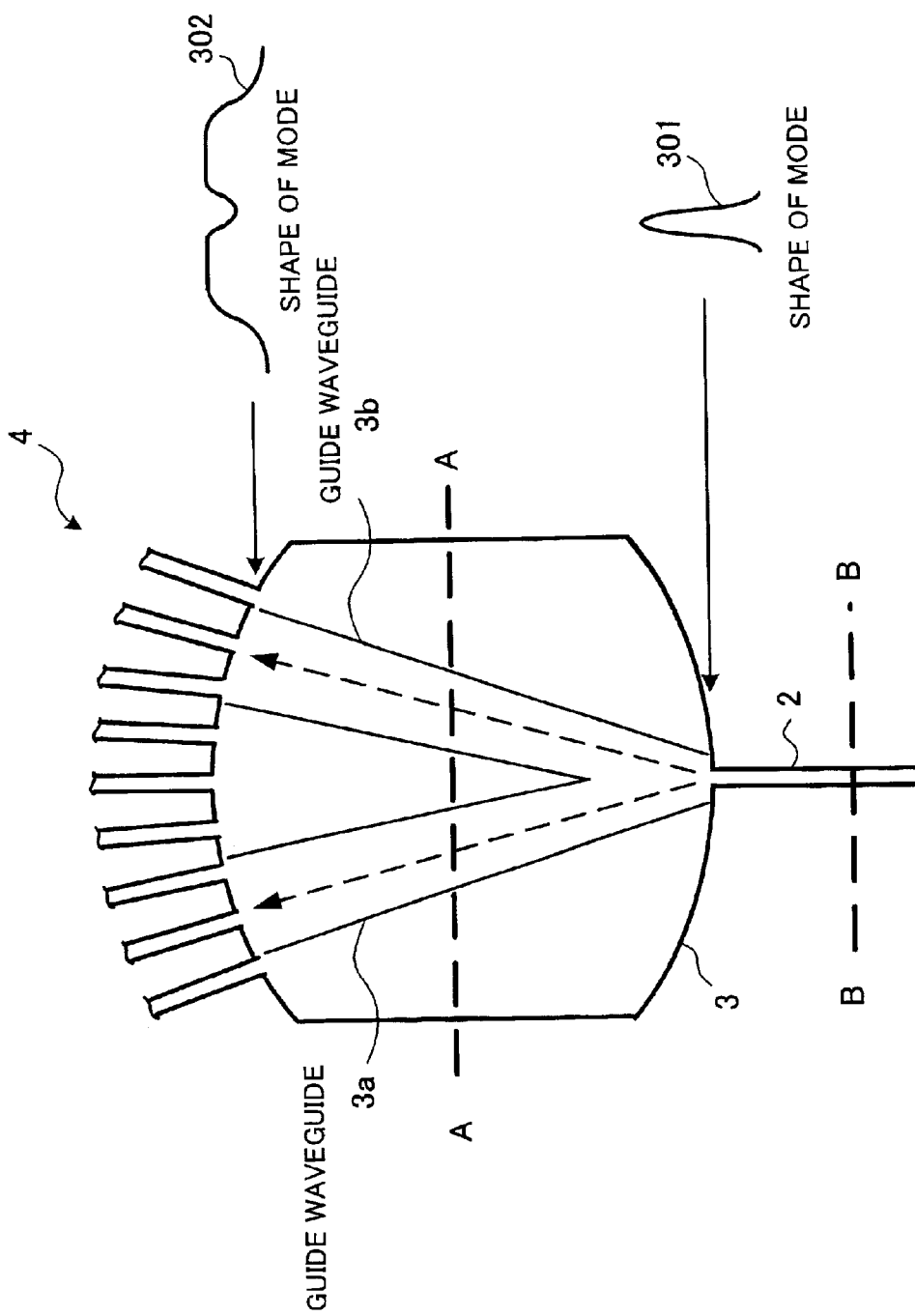
FIG. 1 is a plan view showing a first example of the shape of guide waveguides applicable to the present invention.

Now, examples of the shape of a guide waveguide according to the present invention will be described. FIG. 1 is a plan view showing a first example of the shape of guide waveguides applicable to the present invention. In FIG. 1, the shape of modes of optical signal which propagates through the sector slab waveguide 3 is also shown.

In FIG. 1, the optical input waveguide 2 connected to the entrance of the sector slab waveguide 3 includes one waveguide. Two guide waveguides 3a and 3b are formed inside the sector slab waveguide 3.

In FIG. 1, the range of areas where an effective refractive index is greater than an effective refractive index of the sector slab waveguide 3 is shown as the shape of the guide waveguides 3a and 3b. When the guide waveguides 3a and 3b are looked at from the top of the sector slab waveguide 3, they are long and narrow in shape and extend radially to the exit with the center of curvature at the entrance as a starting point. The axis along an optical path of each of the guide waveguides 3a and 3b is a straight line and the width of the guide waveguides 3a and 3b gradually widens in the direction of the input side to the output side. The width at the entrance of the guide waveguides 3a and 3b is greater than that of a core in the optical input waveguide 2.

If the guide waveguides 3a and 3b having this shape are formed, optical signal input from the optical input waveguide 2 propagates through the core in the sector slab waveguide 3 to the exit and is guided strongly through areas of the guide waveguides 3a and 3b. As a result, peaks will be gradually formed in the shape of a mode of the optical signal propagating along the guide waveguides 3a and 3b.

As shown by a curve 301, for example, optical signal input from the optical input waveguide 2 has one peak and the width of the shape of its mode is narrow. As shown by a curve 302, however, two peaks appear in the shape of a mode of the optical signal at the exit by forming the two guide waveguides 3a and 3b. In this case, the sharpness of the shape, the spread of the width, etc. of the peaks will vary according to conditions, such as the width of each of the guide waveguides 3a and 3b, an angle at which the guide waveguides 3a and 3b branch, and a difference in effective refractive index between the core and guide waveguides 3a and 3b. Therefore, by changing the shape of the two guide waveguides 3a and 3b, the shape of a mode of output optical signal can be controlled accurately. That is to say, by selecting proper structural parameters, passband characteristics needed in the optical output waveguides 6 can be obtained.

In the above first example, the axis along an optical path of each of the guide waveguides 3a and 3b is a straight line. However, the axis along an optical path of each of the guide waveguides 3a and 3b maybe, for example, a curve. Moreover, the width of each of the guide waveguides 3a and 3b maybe constant. In addition, each of the guide waveguides 3a and 3b does not need to extend to the exit of the sector slab waveguide 3. As described later, three or more guide waveguides may be formed.

In all of these cases, however, the guide waveguides 3a and 3b must be formed so that they branch off radially at the center of curvature of the sector slab waveguide 3 without overlapping. Furthermore, to widen the shape of a mode of input optical signal, the width of each of the guide waveguides 3a and 3b should be greater than that of the core in the optical input waveguide 2. In addition, to reliably guide optical signal input from the optical input waveguide 2 through the guide waveguides 3a and 3b, it is preferable to make the entrance of the sector slab waveguide 3 the entrance of each of the guide waveguides 3a and 3b.

Now, an example of the internal structure of the sector slab waveguide 3 in which the guide waveguides 3a and 3b having the shape shown in the above first example are formed will be given and the structure of the guide waveguides 3a and 3b will be described.

Figure 3A:
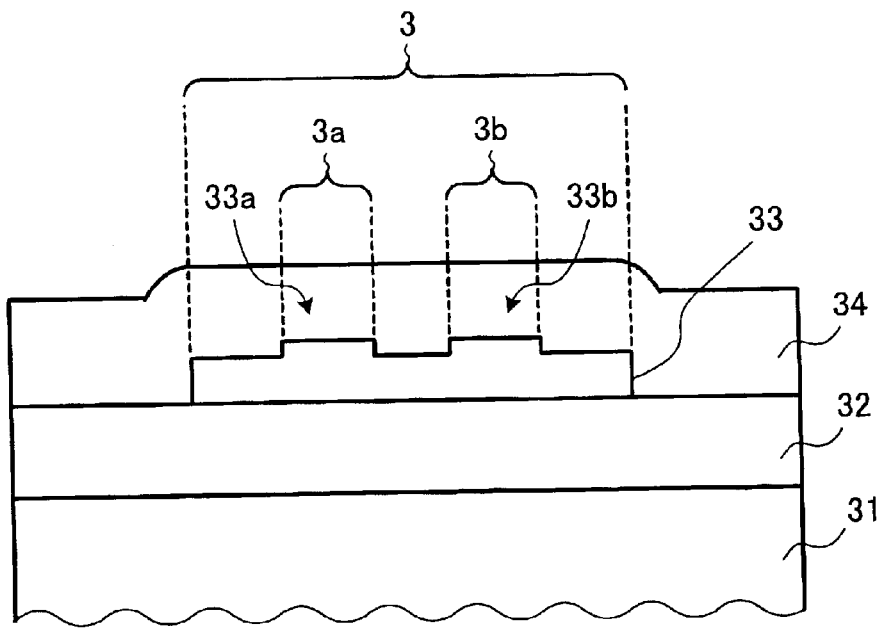
FIGS. 3(A) and 3(B) are cross-sectional views showing a first example of the internal structure of the sector slab waveguide on the input side.
Figure 3B:
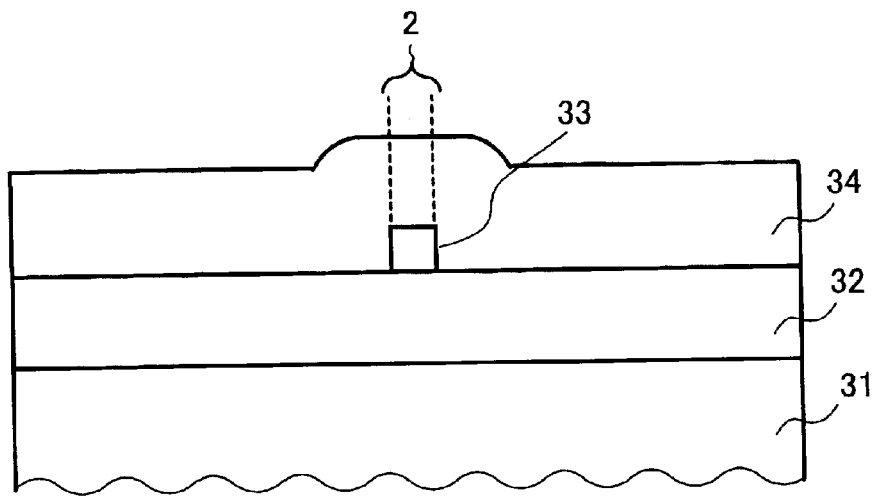

FIGS. 3(A) and 3(B) are cross-sectional views showing a first example of the internal structure of the sector slab waveguide 3. FIG. 3(A) shows a cross-sectional view taken at the middle along an optical path of the sector slab waveguide 3, that is to say, taken along the line A—A of FIG. 1. FIG. 3(B) shows a cross-sectional view taken at a position where the optical input waveguide 2 is located, that is to say, taken along the line B—B of FIG. 1.

As shown in FIGS. 3(A) and 3(B), the optical multiplexer/demultiplexer 1 has the following cross-sectional structure. A lower clad 32 is formed on a silicon substrate 31, a core 33 is formed on the lower clad 32, and an upper clad 34 is formed on the lower clad 32 and core 33. The core 33 is made from material of the refractive index of which is greater than those of the lower clad 32 and upper clad 34 by, for example, 0.5 percent or so. The optical input waveguide 2, sector slab waveguide 3, etc. included in a waveguide structure in the optical multiplexer/demultiplexer 1 include the core 33. The thickness of the core 33 in the optical input waveguide 2 and sector slab waveguide 3 is uniform. In the optical input waveguide 2 and sector slab waveguide 3, the top of the upper clad 34 is protuberant so that an effective refractive index will not change in the upper areas of the core 33.

As shown in FIG. 3(A), a film of the core 33 in a core area 33a which forms the guide waveguide 3a and a core area 33b which forms the guide waveguide 3b is uniform in thickness and is thicker than the film of the core 33 in the other areas. In this structure, an effective refractive index in the thicker core areas 33a and 33b is greater than an effective refractive index in the other areas. Therefore, when optical signal propagates through the core 33, it is confined and is guided more strongly in the core areas 33a and 33b. This structure can be formed in, for example, the following way. After the core 33 of uniform thickness is formed on the lower clad 32, areas on the core 33 other than the guide waveguides 3a and 3b are selectively removed by, for example, dry etching to diminish the thickness of the core 33.

Figure 4A:
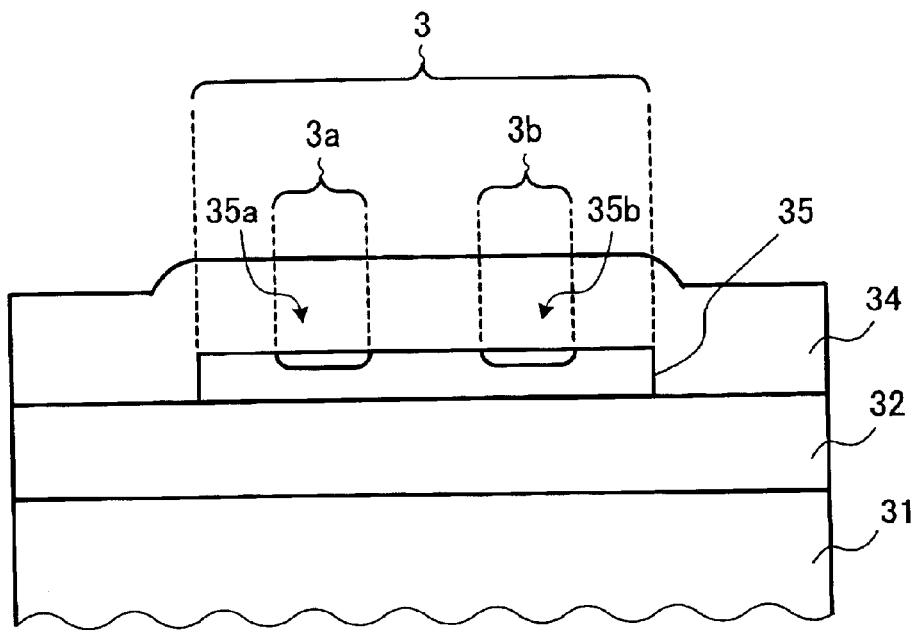
FIGS. 4(A) and 4(B) are cross-sectional views showing a second example of the internal structure of the sector slab waveguide on the input side.
Figure 4B:
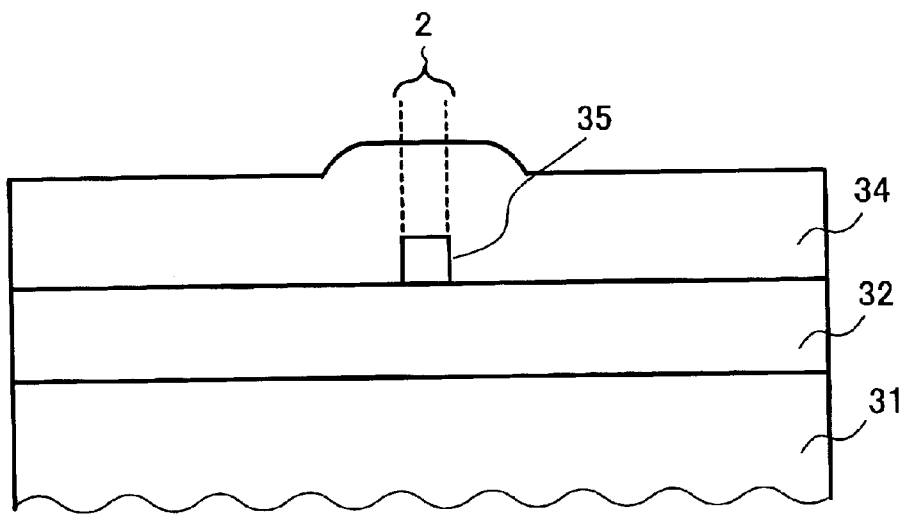

FIGS. 4(A) and 4(B) are cross-sectional views showing a second example of the internal structure of the sector slab waveguide 3. FIG. 4(A) shows a cross-sectional view taken at the middle along an optical path of the sector slab waveguide 3. FIG. 4(B) shows a cross-sectional view taken at a position where the optical input waveguide 2 is located. These are the same as FIGS. 3(A) and 3(B) respectively. In FIG. 4, elements corresponding to those in FIG. 3 are represented by the same symbols.

In the second example of the internal structure of the sector slab waveguide 3 shown in FIGS. 4(A) and 4(B), a lower clad 32 is formed on a silicon substrate 31, a core 35 is formed on the lower clad 32, and an upper clad 34 is formed on the lower clad 32 and core 35. This basic structure is the same with FIG. 3. A refractive index in the core 35 is greater than a refractive index in the lower clad 32 and upper clad 34. Moreover, it is assumed that the shape of guide waveguides 3a and 3b looked at from the top of the sector slab waveguide 3 is the same as that of the guide waveguides 3a and 3b in the first example shown in FIG. 1.

As shown in FIG. 4(A), in this example, an additive having the effect of making a refractive index in a core area 35a which forms the guide waveguide 3a and a core area 35b which forms the guide waveguide 3b greater than a refractive index in the core 35 is selectively doped in the core 35. As a result, an effective refractive index in the core areas 35a and 35b is greater than an effective refractive index in the other core areas. Therefore, when light propagates through the core 35, it is guided more strongly through the core areas 35a and 35b.

In this structure, material, such as Ge or Ti, can be used as an additive doped in material for the core 35. To be concrete, if the lower clad 32 and upper clad 34 are made from material, such as B-P-silica glass (BPSG) or P-silica glass (PSG), or silica glass in which an additive is not doped, then the core 35 will be made from material, such as Ge-P-silica glass (GPSG) or Ti-P-silica glass (TPSG), to make a refractive index in the core 35 greater than a refractive index in the lower clad 32 and upper clad 34 by, for example, 0.5 percent or so. In this case, a relative refractive index in the core areas 35a and 35b can be increased by doping the GPSG or TPSG in the core areas 35a and 35b the Ge or Ti content of which is higher than that of the GPSG or TPSG doped in the core 35.

In this example, the same effect will be obtained by doping an additive having the effect of lowering a refractive index in areas in the core 35 other than the core areas 35a and 35b.

Figure 5A:
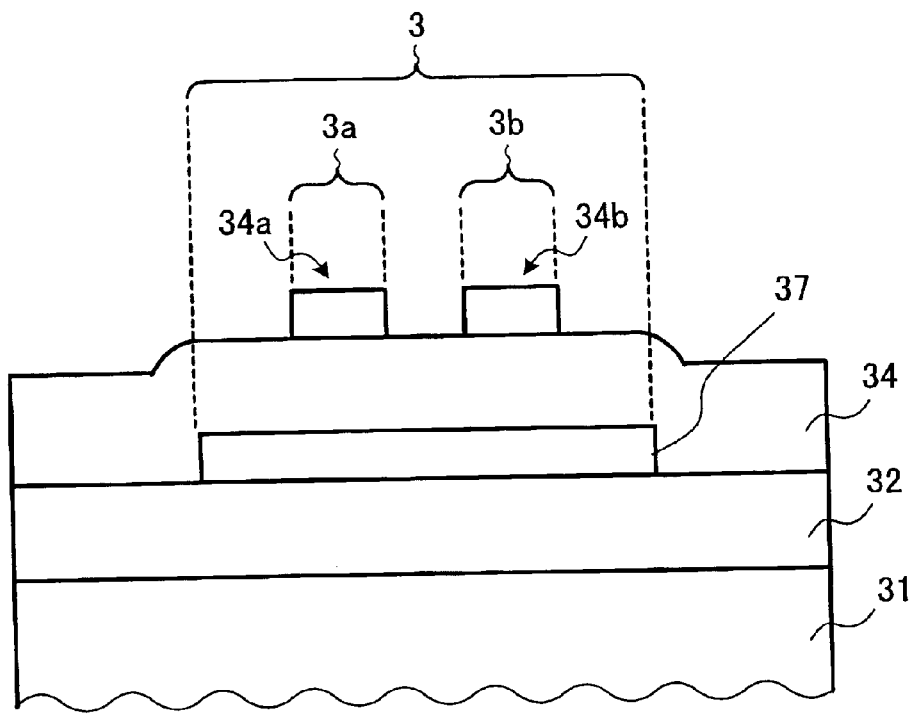
FIGS. 5(A) and 5(B) are cross-sectional views showing a third example of the internal structure of the sector slab waveguide on the input side.
Figure 5B:
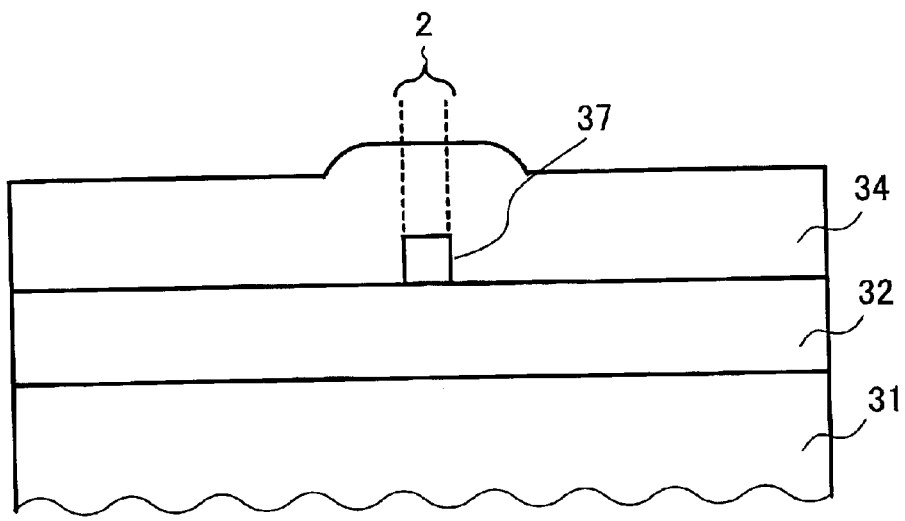

FIGS. 5(A) and 5(B) are cross-sectional views showing a third example of the internal structure of the sector slab waveguide 3. FIG. 5(A) shows a cross-sectional view taken at the middle along an optical path of the sector slab waveguide 3. FIG. 5(B) shows a cross-sectional view taken at a position where the optical input waveguide 2 is located. These are the same as FIGS. 3(A) and 3(B) respectively. In FIG. 5, elements corresponding to those in FIG. 3 are represented by the same symbols.

In the third example of the internal structure of the sector slab waveguide 3 shown in FIGS. 5(A) and 5(B), a lower clad 32 is formed on a silicon substrate 31, a core 37 is formed on the lower clad 32, and an upper clad 34 is formed on the lower clad 32 and core 37. This basic structure is the same with FIGS. 3 and 4. A refractive index in the core 37 is greater than a refractive index in the lower clad 32 and upper clad 34. Moreover, it is assumed that the shape of guide waveguides 3a and 3b looked at from the top of the sector slab waveguide 3 is the same as that of the guide waveguides 3a and 3b in the first example shown in FIG. 1.

As shown in FIG. 5(A), in this example, a film of the core 37 in the sector slab waveguide 3 is uniform in thickness and a clad area 34a which forms the guide waveguide 3a and a clad area 34b which forms the guide waveguide 3b are formed. A film of the upper clad 34 in the clad areas 34a and 34b is thicker than the film of the upper clad 34 in the other areas. An effective refractive index changes in areas where the clad areas 34a and 34b are formed, so an effective refractive index in areas in the core 37 right below the clad areas 34a and 34b is greater than an effective refractive index in the other areas in the core 37. Therefore, when optical signal propagates through the core 37, it is guided more strongly through the areas in the core 37 right below the clad areas 34*a* and 34*b*.

This structure can be formed in, for example, the following way. After the lower clad 32, core 37, and upper clad 34 are formed in that order, areas on the upper clad 34 other than the clad areas 34*a* and 34*b* are selectively removed by, for example, dry etching to diminish the thickness of the upper clad 34. Compared with the above first and second examples, this structure can be manufactured easily.

By the way, three or more guide waveguides can be formed in the sector slab waveguide 3. Now, examples of the shape of such guide waveguides will be given.

Figure 6:
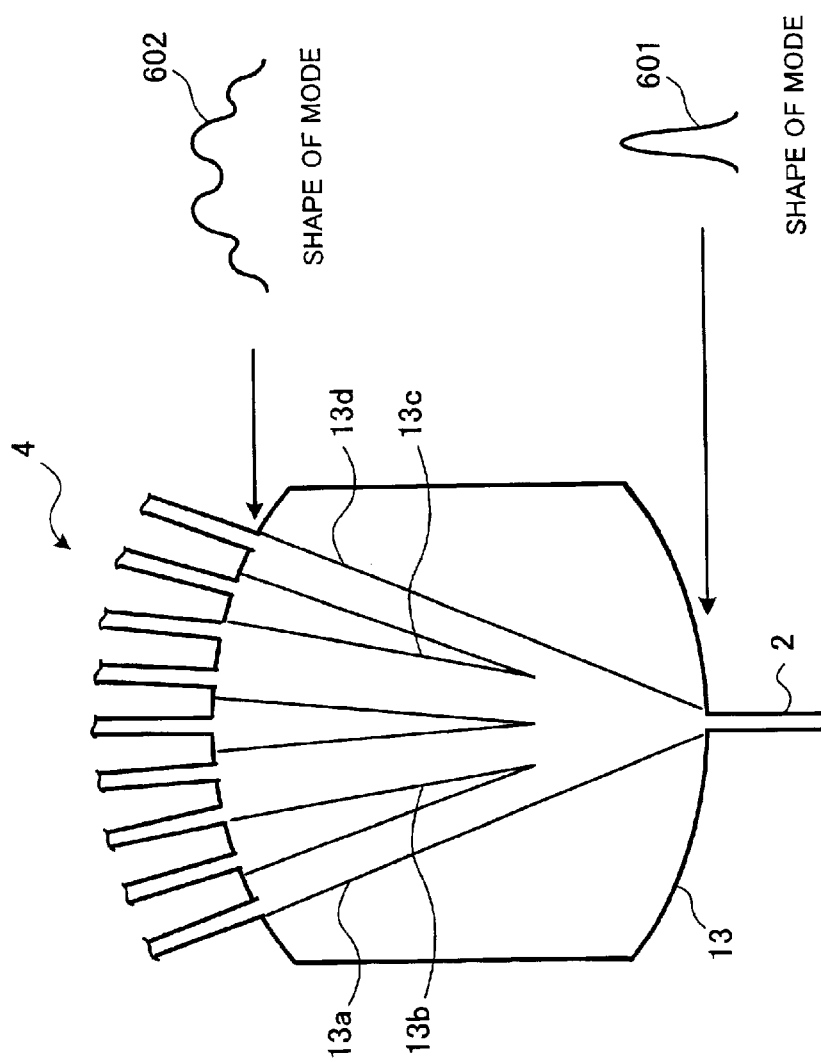
FIG. 6 is a plan view showing a second example of the shape of guide waveguides applicable to the present invention.

FIG. 6 is a plan view showing a second example of the shape of guide waveguides applicable to the present invention. In FIG. 6, the shape of modes of light which propagates through a sector slab waveguide is also shown. In FIG. 6, elements corresponding to those in FIG. 1 are represented by the same symbols.

In FIG. 6, an optical input waveguide 2 with, for example, one waveguide is connected to the entrance of a sector slab waveguide 13. This is the same with the first example shown in FIG. 1. In the sector slab waveguide 13, four guide waveguides 13*a*, 13*b*, 13*c*, and 13*d*, for example, are formed.

In FIG. 6, the range of areas where an effective refractive index is greater than an effective refractive index of the sector slab waveguide is shown as the shape of the guide waveguides 13*a* through 13*d*. When the guide waveguides 13*a* through 13*d* are looked at from the top of the sector slab waveguide 13, they are long and narrow in shape and extend radially to the exit with the center of curvature at the entrance as a starting point. The width of the guide waveguides 13*a* through 13*d* at the entrance is greater than that of a core in the optical input waveguide 2.

If the guide waveguides 13*a* through 3*d* having this shape are formed, optical signal input from the optical input waveguide 2 propagates through the core in the sector slab waveguide 13 to the exit and is guided strongly through the areas of the guide waveguides 13*a* through 13*d*. For example, if the shape of a mode of optical signal input from the optical input waveguide 2 has one peak, which is shown by a curve 601, then the shape of a mode of the optical signal at the exit will have a plurality of peaks, which is shown by a curve 602.

To obtain proper passband characteristics in optical output waveguides 6, it is preferable in some cases that a plurality of peaks appear in the shape of a mode of optical signal generated in the sector slab waveguide 13 on the input side. For example, there are cases where the shape of a mode with two peaks having the highest intensity of optical signal and a plurality of side peaks having low intensity of optical signal is preferable.

As stated above, if the guide waveguides 13*a* through 13*d*, that is to say, three or more guide waveguides are formed, the number, height, sharpness of the shape, spread of the width, etc. of peaks which appear in the shape of a mode of optical signal generated in the sector slab waveguide 13 will vary according to conditions, such as the number of the guide waveguides 13*a* through 13*d*, the width of each of the guide waveguides 13*a* through 13*d*, angles at which the guide waveguides 13*a* through 13*d* branch off, and a difference in effective refractive index between the core and guide waveguides 13*a* through 13*d*. Therefore, by changing the shape of the guide waveguides 13*a* through 13*d*, the shape of a mode of output optical signal can be controlled accurately. That is to say, by selecting proper structural parameters, passband characteristics needed in the optical output waveguides 6 can be obtained.

Other requirements for the shape of the guide waveguides 13*a* through 13*d* in the second example shown in FIG. 6 are the same as those in the above first example in which there are two guide waveguides. That is to say, the guide waveguides 13*a* through 13*d* must be formed so that they branch at the center of curvature of the sector slab waveguide 13 without one of them overlapping another. Moreover, the axis along an optical path of each of the guide waveguides 13*a* through 13*d* may be a straight line or a curve. The width of each of the guide waveguides 13*a* through 13*d* may be constant or gradually widen in the direction of the input side to the output side. In addition, each of the guide waveguides 13*a* through 13*d* does not need to extend to the exit of the sector slab waveguide 13.

Figure 7:
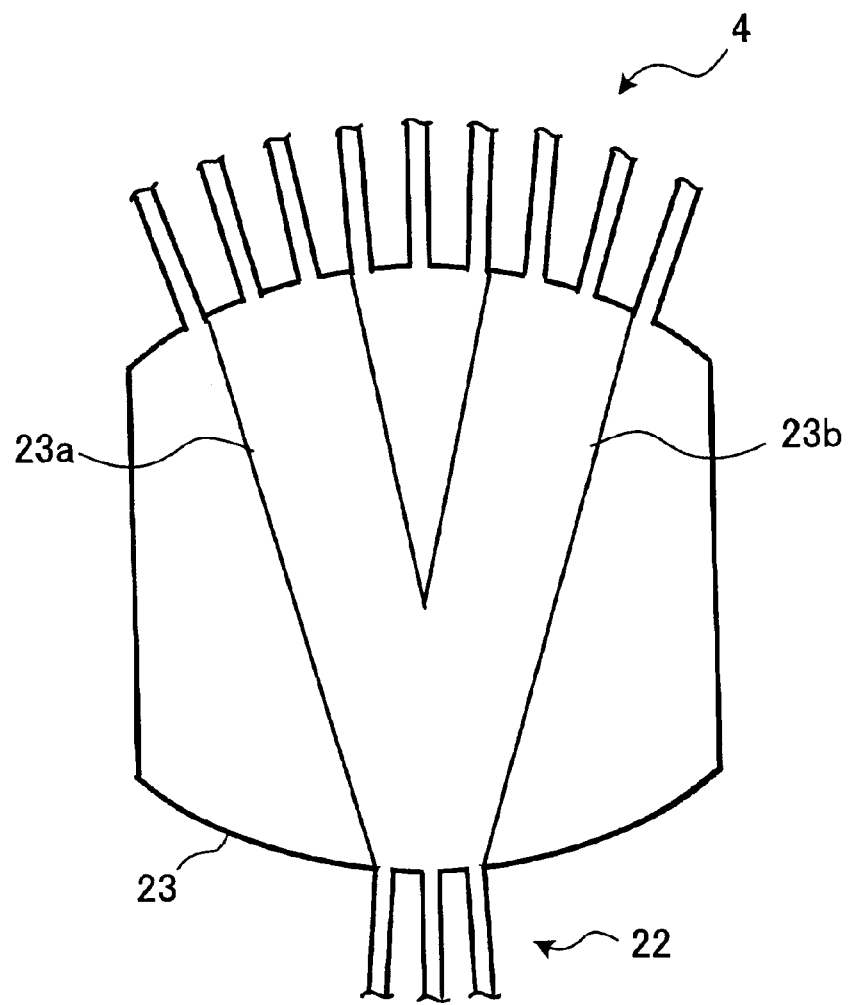
FIG. 7 is a plan view showing a third example of the shape of guide waveguides applicable to the present invention.

Now, an example of the shape of guide waveguides in the case of an optical input waveguide connected to a sector slab waveguide including a plurality of waveguides will be described. FIG. 7 is a plan view showing a third example of the shape of guide waveguides applicable to the present invention. In FIG. 7, elements corresponding to those in FIG. 1 are represented by the same symbols.

In FIG. 7, an optical input waveguide 22 including, for example, three waveguides is connected to the entrance of a sector slab waveguide 23. In the sector slab waveguide 23, two guide waveguides 23*a* and 23*b* are formed.

In FIG. 7, the range of areas where an effective refractive index is greater than an effective refractive index of the sector slab waveguide is shown as the shape of the guide waveguides 23*a* and 23*b*. When the guide waveguides 23*a* and 23*d* are looked at from the top of the sector slab waveguide 23, they are long and narrow in shape and extend radially to the exit with the center of curvature at the entrance as a starting point.

If the optical input waveguide 22 includes a plurality of waveguides, it is preferable that the width at the entrance of each of the guide waveguides 23*a* and 23*d* is greater than or equal to that of an area where cores in the waveguides of the optical input waveguide 22 are located in parralel. If this condition is met, then optical signal input from all the waveguides connected is guided strongly through each of the guide waveguides 23*a* and 23*d*. As a result, the shape of a mode of the optical signal can be changed.

Other requirements for the shape of the guide waveguides 23*a* and 23*b* are the same as those in the above first example in which the optical input waveguide 22 includes one waveguide. That is to say, the guide waveguides 23*a* and 23*b* must be formed so that they branch at the center of curvature of the sector slab waveguide 23 without overlapping. Moreover, the axis along an optical path of each of the guide waveguides 23*a* and 23*b* may be a straight line or a curve. The width of each of the guide waveguides 23*a* and 23*b* may be constant or gradually widen in the direction of the input side to the output side. In addition, each of the guide waveguides 23*a* and 23*b* does not need to extend to the exit of the sector slab waveguide 23. Furthermore, as shown in the above second example, three or more guide waveguides may be formed.

If the above structure is adopted, the shape of a mode of output optical signal by changing the shape of the two guide waveguides 23*a* and 23*b* can be controlled accuracy. That is to say, by selecting proper structural parameters, passband characteristics needed in the optical output waveguides 6 can be obtained.

By the way, in the above optical multiplexer/demultiplexer, the shape of a mode of optical signal generated is controlled by forming guide waveguides in a sector slab waveguide on the input side. However, the shape of a mode of optical signal can be controlled not only by this method but also by changing the structure of a portion of a sector slab waveguide on the input side where an optical input waveguide is connected. As a result, the shape of a mode of light can be controlled more flexibly. In addition, great connection loss occurs between a sector slab waveguide having the above structure and an arrayed waveguide. Now, examples of the structure of an optical multiplexer/demultiplexer including a sector slab waveguide on the input side the connection structure of which at the entrance and exit is different from that of the above sector slab waveguide will be described.

Figure 8:
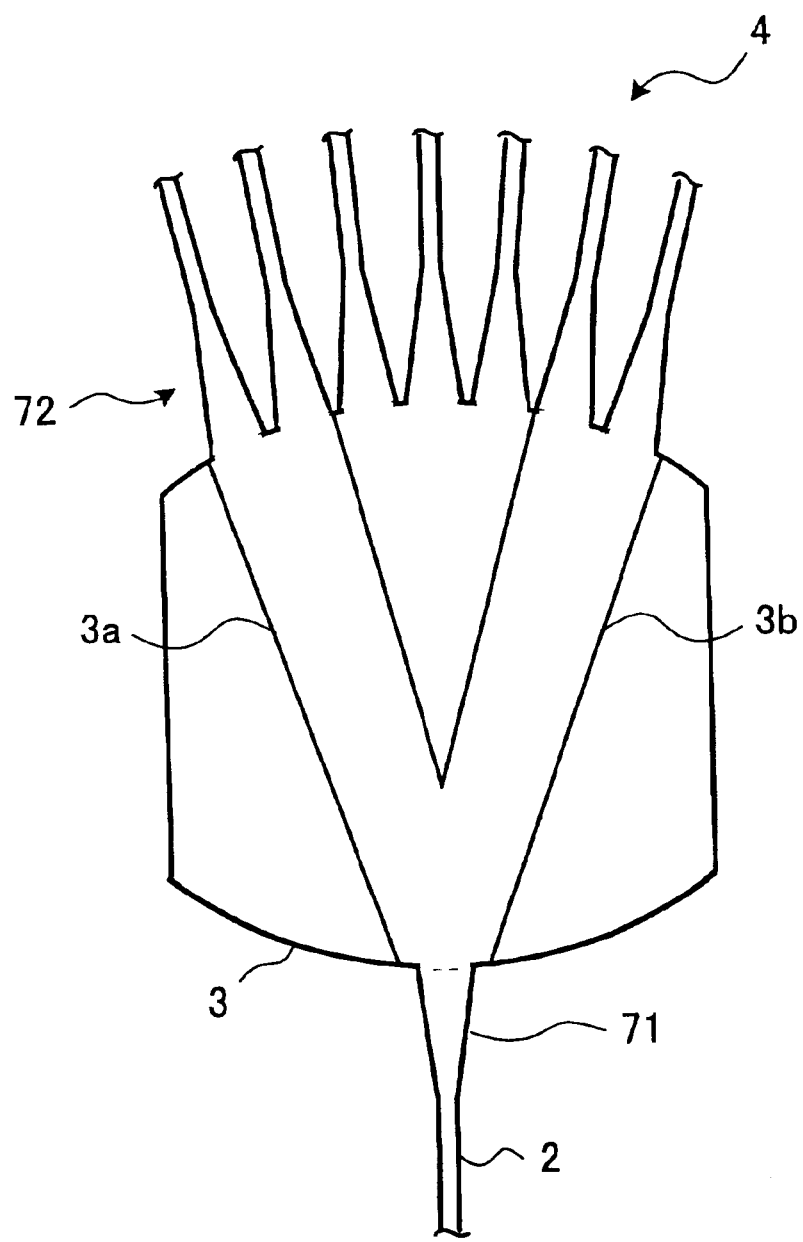
FIG. 8 is a plan view showing an example of the structure of portions around a sector slab waveguide the connection structure of which at the entrance and exit is changed.

FIG. 8 is a plan view showing an example of the structure of portions around a sector slab waveguide which the connection structure at the entrance and exit is changed. In FIG. 8, elements corresponding to those in FIG. 1 are represented by the same symbols.

In FIG. 8, two guide waveguides 3a and 3b the shape of which is the same with FIG. 1 are formed in a sector slab waveguide 3. A tapered waveguide 71, both sides of which slope the same so that the width of a core will gradually widen, is formed at the exit of an optical input waveguide 2 including one waveguide. One end of the tapered waveguide 71 is connected to the entrance of the sector slab waveguide 3. Moreover, a tapered waveguide 72, both sides of which slope the same so that the width of a core will gradually widen in the direction of the sector slab waveguide 3, is formed at the entrance of each of waveguides included in an arrayed waveguide 4. One end of the tapered waveguide 72 is connected to the exit of the sector slab waveguide 3.

The tapered waveguide 71 widens the distribution of the intensity of optical signal output to the sector slab waveguide 3 and controls the spread of the width of the entire shape of a mode of the optical signal. Therefore, by changing not only structural parameters for the guide waveguides 3a and 3b formed in the sector slab waveguide 3 but also structural parameters for the tapered waveguide 71, the shape of a mode of optical signal which propagates through the sector slab waveguide 3 can be controlled more flexibly. As a result, more proper passband characteristics can be obtained in optical output waveguides 6.

Intensity is widely distributed across the shape of a mode of optical signal which propagated through the sector slab waveguide 3, and this shape does not match the shape of a mode for each arrayed waveguide to which the optical signal is input. As a result, connection loss will occur between the sector slab waveguide 3 and arrayed waveguides 4. By connecting the sector slab waveguide 3 and arrayed waveguide 4 with the tapered waveguide 72, the width of a core in each waveguide connected to the sector slab waveguide 3 widens and the shape of a mode for each waveguide becomes close to the shape of a mode of optical signal input from the sector slab waveguide 3. This reduces connection loss which will occur between the sector slab waveguide 3 and arrayed waveguide 4, and increases the intensity of optical signal obtained in the optical output waveguides 6.

A conventional mode conversion waveguide in the shape of a paraboloid may be located at the entrance of the sector slab waveguide 3. Moreover, in some cases, connection loss can be reduced by narrowing the width of a core in each waveguide connected to the exit of the sector slab waveguide 3 instead of widening it.

Figure 9:
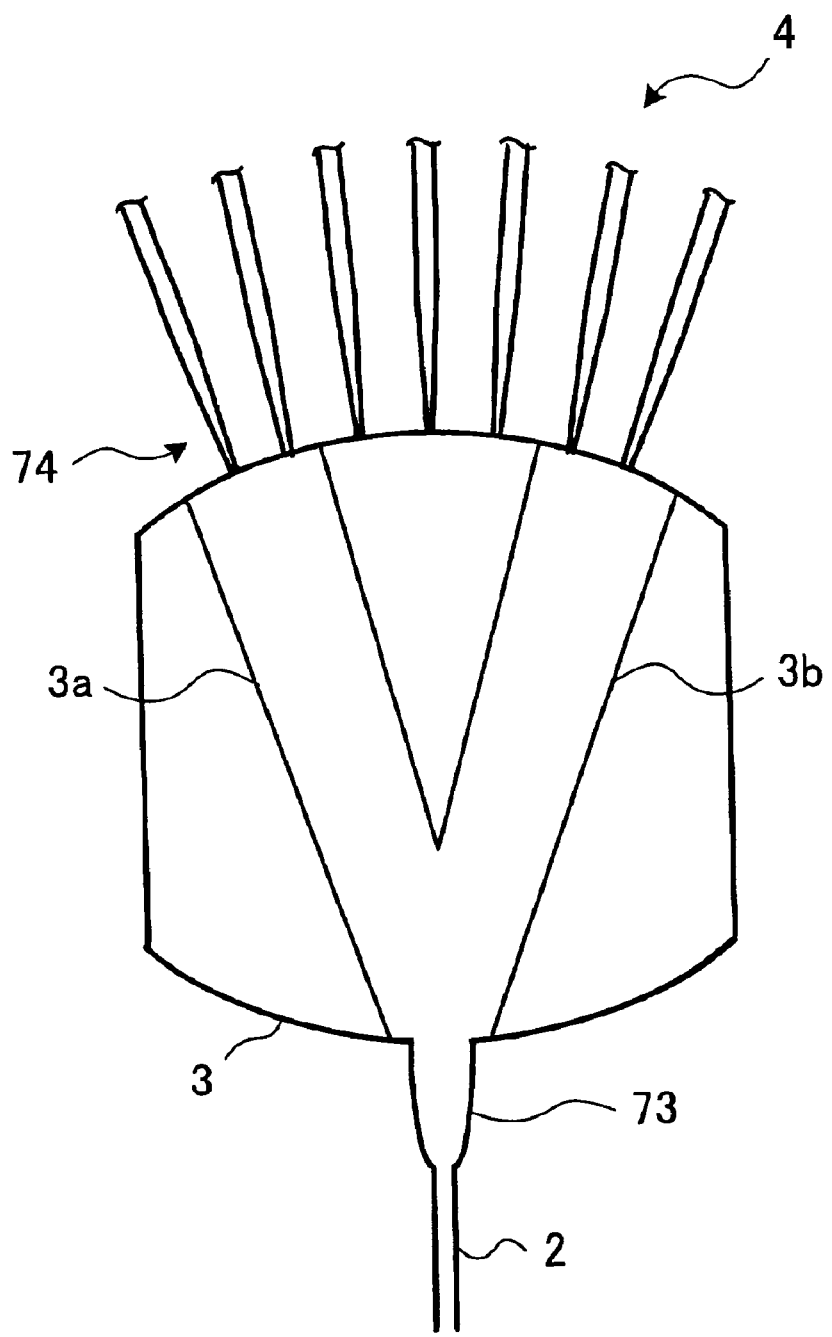
FIG. 9 is a plan view showing another example of the structure of portions around a sector slab waveguide the connection structure of which at the entrance and exit is changed.

Now, an example of such structure will be given. FIG. 9 is a plan view showing another example of the structure of portions around a sector slab waveguide which the connection structure of which at the entrance and exit is changed. In FIG. 9, elements corresponding to those in FIG. 1 are represented by the same symbols.

In FIG. 9, two guide waveguides 3a and 3b having the shape of which is the same with FIG. 1 are formed in a sector slab waveguide 3. A mode conversion waveguide 73, both sides of which are in the shape of a parabola spreading in the direction of the exit, is formed at the exit of an optical input waveguide 2 including one waveguide. The exit of the mode conversion waveguide 73 is connected to the entrance of the sector slab waveguide 3. Moreover, a tapered waveguide 74, both sides of which slope the same so that the width of a core will gradually narrow in the direction of the sector slab waveguide 3, is formed at the entrance of each of waveguides included in an arrayed waveguide 4. One end of the tapered waveguide 74 is connected to the exit of the sector slab waveguide 3.

The mode conversion waveguide 73 converts single mode optical signal output from the optical input waveguide 2 into optical signal in the shape of a mode of which two peaks appear, and outputs the optical to the sector slab waveguide 3. Therefore, by changing not only structural parameters for the guide waveguides 3a and 3b formed in the sector slab waveguide 3 but also structural parameters for the mode conversion waveguide 73, the shape of a mode of optical signal which propagates through the sector slab waveguide 3 can be controlled more flexibly. As a result, more proper passband characteristics can be obtained in optical output waveguides 6.

In some cases, the shape of a mode for a waveguide connected to the sector slab waveguide 3 can be widened by narrowing the width of a core in the waveguide. Therefore, by properly selecting structural parameters for the tapered waveguide 74, in which the width of the core gradually narrows in the direction of the sector slab waveguide 3, connection loss which will occur between the sector slab waveguide 3 and tapered waveguide 74 can be reduced.

The above tapered waveguide 71 and mode conversion waveguide 73 at the entrance of the sector slab waveguide 3 and the above tapered waveguides 72 and 74 at the exit of the sector slab waveguide 3 can be combined properly and be formed. How to combine them and their structural parameters should be selected according to passband characteristics needed in the optical output waveguides 6, the shape of modes generated by the guide waveguides 3a and 3b, etc. They may be formed only at the entrance or exit of the sector slab waveguide 3. Furthermore, an optical input waveguide in which the width of a core in each of waveguides gradually narrows can also be formed at the entrance of the sector slab waveguide 3.

Figure 10:
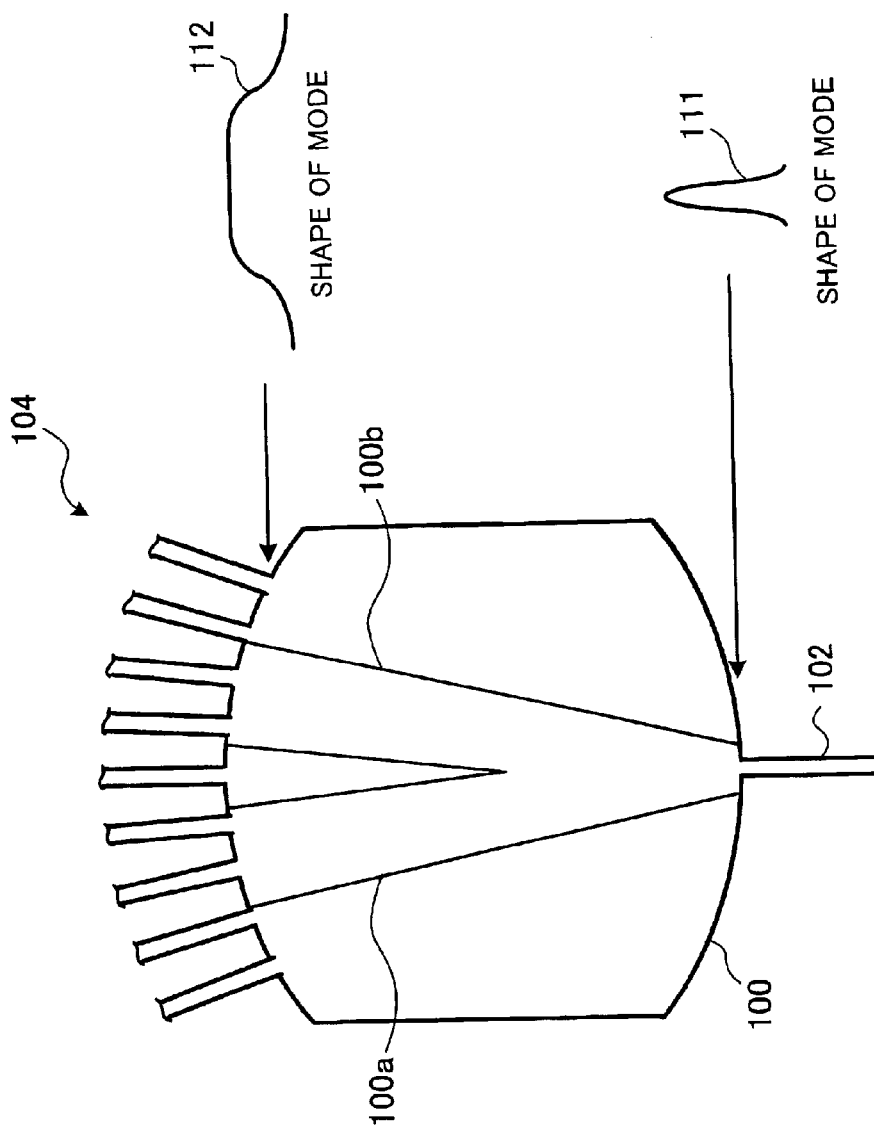
FIG. 10 is a plan view showing the structure of a waveguide type optical coupler according to the present invention.

By the way, only the sector slab waveguide on the input side included in the above optical multiplexer/demultiplexer according to the present invention is sometimes used as a waveguide type optical coupler. FIG. 10 is a plan view showing the structure of a waveguide type optical coupler according to the present invention. In FIG. 10, the shape of modes of optical signal which propagates through a waveguide type optical coupler is also shown.

The basic structure of a waveguide type optical coupler 100 shown in FIG. 10 is the same as that of the above sector slab waveguide 3 shown in, for example, FIG. 1. That is to say, the waveguide type optical coupler 100 comprises a sector slab waveguide to the entrance of which an optical input waveguide 102 is connected and to the exit of which a plurality of optical output waveguides 104 are connected.

The waveguide type optical coupler 100 spreads optical signal input from the optical input waveguide 102 to the plurality of optical output waveguides 104.

In this example, two guide waveguides 100a and 100b are formed in the waveguide type optical coupler 100. The basic structure of the guide waveguides 100a and 100b is the same as that of the guide waveguides 3a and 3b shown in FIG. 1. For example, when the guide waveguides 100a and 100b are looked at from the top of the waveguide type optical coupler 100, they are long and narrow in shape, branch at the center of curvature at the entrance, and extend in the direction of the exit.

If the guide waveguides 100a and 100b having this basic structure are formed, optical signal input from the optical input waveguide 102 propagates through a core in the waveguide type optical coupler 100 to the exit and is guided strongly through areas of the guide waveguides 100a and 100b. As a result, peaks will be gradually formed in the shape of a mode of the optical signal propagating along the guide waveguides 100a and 100b.

Structural parameters for the guide waveguides 100a and 100b in the waveguide type optical coupler 100 are selected so that narrow single mode optical signal input from the optical input waveguide 102 as shown by a curve 111 will be converted into optical signal as shown by a curve 112 across the shape of a mode of which intensity is very widely distributed. As a result, the intensity of optical signal input to the plurality of optical output waveguides 104 can be made uniform.

To make the spread of the intensity of optical signal flat, the method of, for example, decreasing an angle at which the two guide waveguides 100a and 100b branch can be used. This reduces the distance between two peaks formed and the shape between the two peaks gradually becomes flat. As another method, the width of each of the guide waveguides 100a and 100b can be narrowed to weaken guided light. As a result, easy peaks are formed and the spread of the intensity of optical signal may become flat. As still another method, many guide waveguides can be formed.

Now, examples of a design for a sector slab waveguide applied to the optical multiplexer/demultiplexer and waveguide type optical coupler according to the present invention will be given. These examples were calculated in simulations. A slab waveguide in the following examples is square in shape, but in reality a slab waveguide is formed so that its exit will be at the same distance from the middle of its entrance.

Figures 11A, 11B:
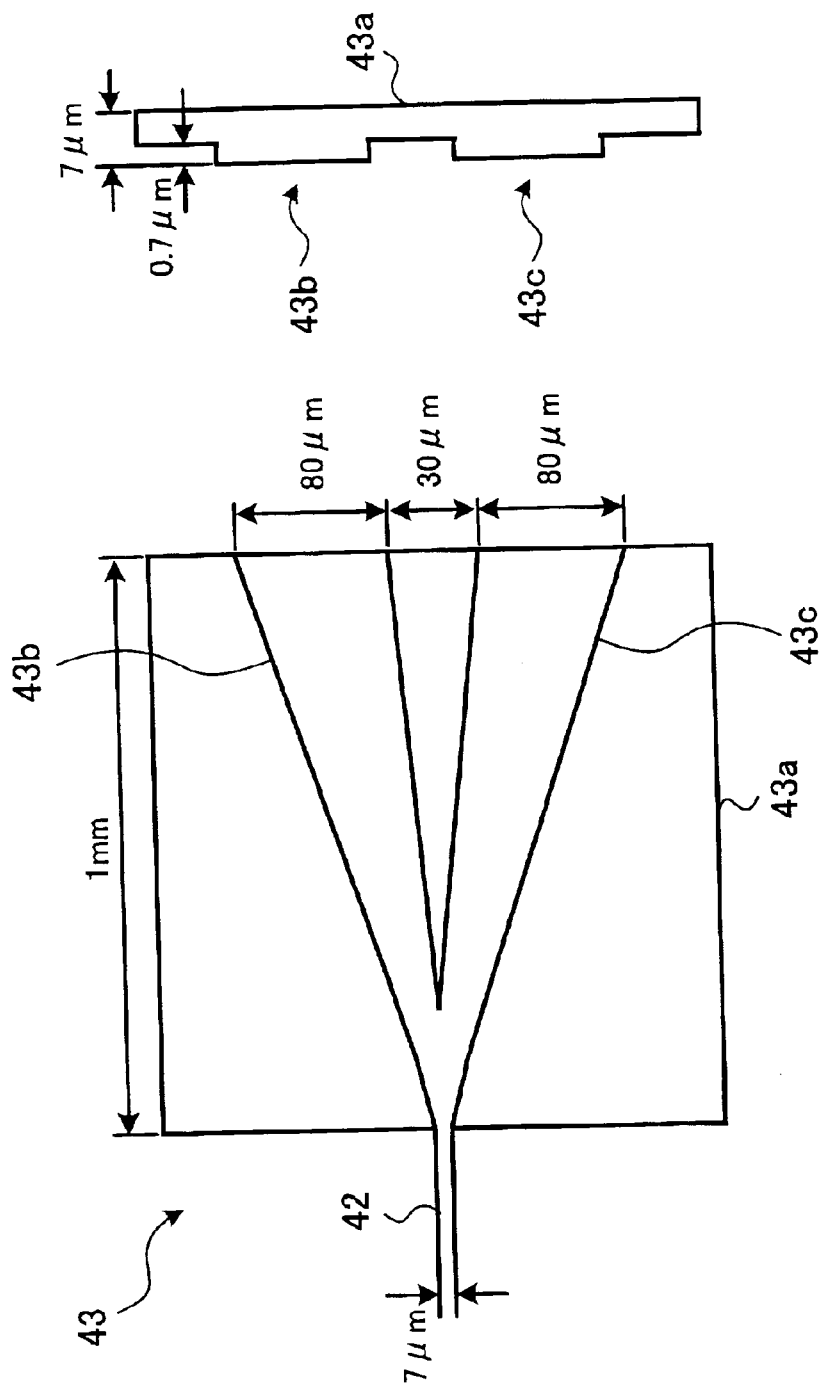
FIGS. 11(A) and 11(B) are views showing a first example of a design for a sector slab waveguide, FIG. 11(A) being a plan view of a sector slab waveguide, FIG. 11(B) being a cross-sectional view of a core at the exit.

FIGS. 11(A) and 11(B) are views showing a first example of a design for a sector slab waveguide. FIG. 11(A) is a plan view of this sector slab waveguide and FIG. 11(B) is a cross-sectional view of a core at the exit.

A sector slab waveguide 43 shown in FIGS. 11(A) and 11(B) is used on the input side of an optical multiplexer/demultiplexer. An optical input waveguide 42 including one waveguide is connected to the entrance of the sector slab waveguide 43. Moreover, two guide waveguides 43b and 43c are formed by changing the thickness of portions of a core 43a.

As shown in FIG. 11(A), the sector slab waveguide 43 comprises a waveguide including the square core 43a each side of which has a length of 1 mm. The guide waveguides 43b and 43c are formed so that they will branch off radially at an end where the optical input waveguide 42 is connected and so that they will extend straight to the exit. The width of each of the guide waveguides 43b and 43c is 7 $\mu$m at the entrance, gradually widens in the direction of the output side, and is 80 $\mu$m at the exit. The width at the entrance of each of the guide waveguides 43b and 43c is the same as that of a core in the optical input waveguide 42. At the exit there is an interval of 30 $\mu$m between the guide waveguides 43b and 43c. As shown in FIG. 11(B), the maximum thickness of the core 43a is 7 $\mu$m. Moreover, areas in the core 43a where the guide waveguides 43b and 43c are formed and the other areas in the core 43a differ in thickness by 0.7 $\mu$m.

Figure 12:
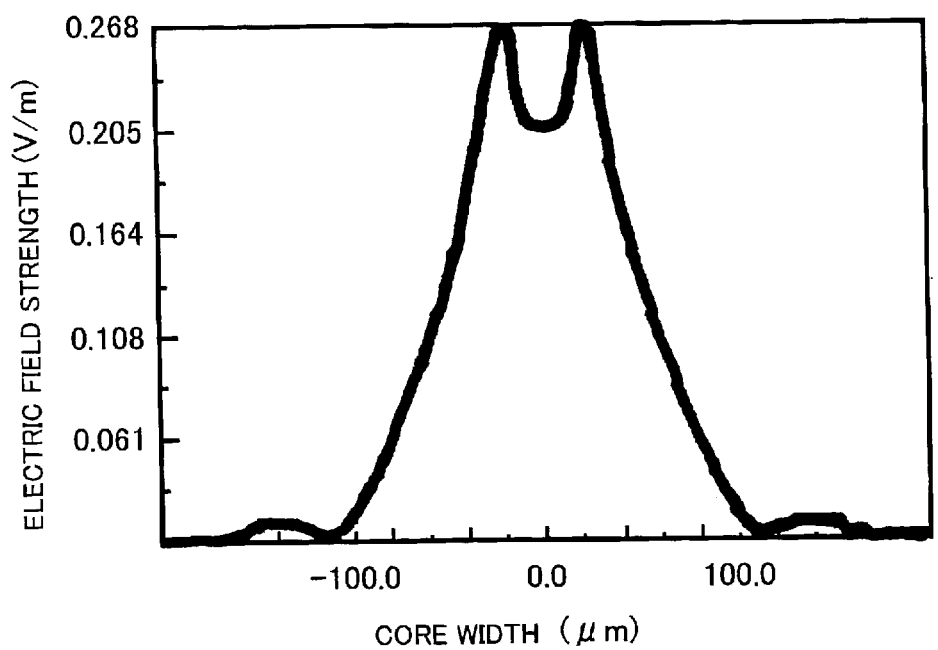
FIG. 12 is a graph showing the shape of a mode of optical signal generated in the first example of a design for a sector slab waveguide.

FIG. 12 is a graph showing the shape of a mode of optical signal generated in the above first example of a design for a sector slab waveguide.

A graph in FIG. 12 shows the shape at the exit of the sector slab waveguide 43 of a mode of optical signal input from the above optical input waveguide 42. In this example, there are sharp peaks and a wave-form drops steeply between the peaks.

Figure 13:
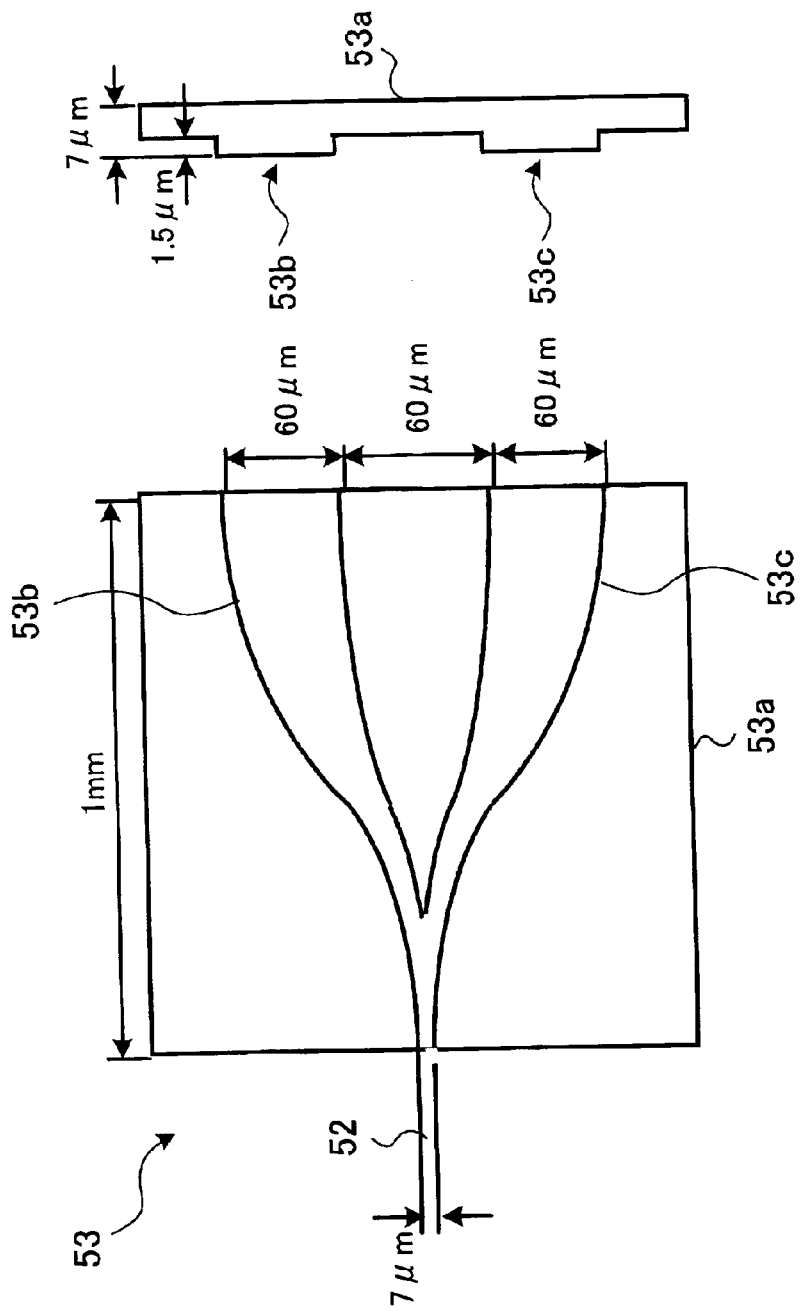
FIGS. 13(A) and 13(B) are views showing a second example of a design for a sector slab waveguide, FIG. 13(A) being a plan view of the sector slab waveguide, FIG. 13(B) being a cross-sectional view of a core at the exit.

FIGS. 13(A) and 13(B) are views showing a second example of a design for a sector slab waveguide. FIG. 13(A) is a plan view of this sector slab waveguide and FIG. 13(B) is a cross-sectional view of a core at the exit.

A sector slab waveguide 53 shown in FIGS. 13(A) and 13(B) is used on the input side of an optical multiplexer/demultiplexer. An optical input waveguide 52 including one waveguide is connected to the entrance of the sector slab waveguide 53. Moreover, two guide waveguides 53b and 53c are formed by changing the thickness of portions of a core 53a. This is the same with the above first example.

As shown in FIG. 13(A), the sector slab waveguide 53 comprises a waveguide including the square core 53a each side of which has a length of 1 mm. The guide waveguides 53b and 53c are formed symmetrically so that they branch at an end where the optical input waveguide 52 is connected, so that they initially curve outward, and so that they afterwards curve inward to extend to the exit. The width of each of the guide waveguides 53b and 53c is 7 $\mu$m at the entrance, gradually widens in the direction of the output side, and is 60 $\mu$m at the exit. The width at the entrance of each of the guide waveguides 53b and 53c is the same as that of a core in the optical input waveguide 52. At the exit there is an interval of 60 $\mu$m between the guide waveguides 53b and 53c. As shown in FIG. 13(B), the maximum thickness of the core 53a is 7 $\mu$m. Moreover, areas in the core 53a where the guide waveguides 53b and 53c are formed and the other areas in the core 53a differ in thickness by 1.5 $\mu$m.

Figure 14:
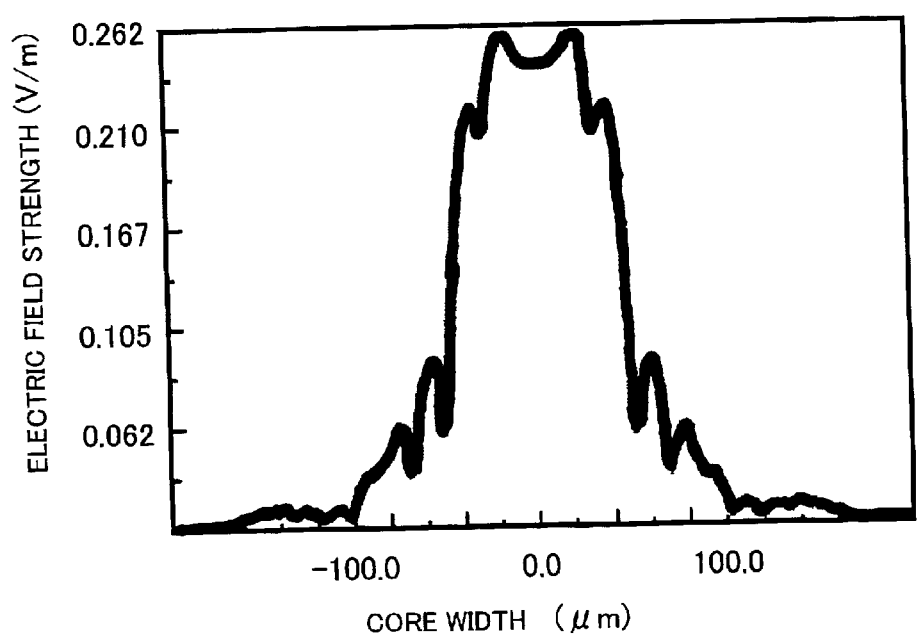
FIG. 14 is a graph showing the shape of a mode of optical signal generated in the second example of a design for a sector slab waveguide.

FIG. 14 is a graph showing the shape of a mode of optical signal generated in the above second example of a design for a sector slab waveguide.

A graph in FIG. 14 shows the shape at the exit of the sector slab waveguide 53 of a mode of optical signal input from the above optical input waveguide 52. Compared with the above first example, a wave-form obtained in this example is easy between peaks. The reason for this is that the width of the guide waveguides 53b and 53c is narrower than that of the guide waveguides 43b and 43c in the first example. As a result, optical signal guided through these areas is weak and a peak far higher in intensity of optical signal than ones generated in surrounding areas is not generated.

Figure 15:
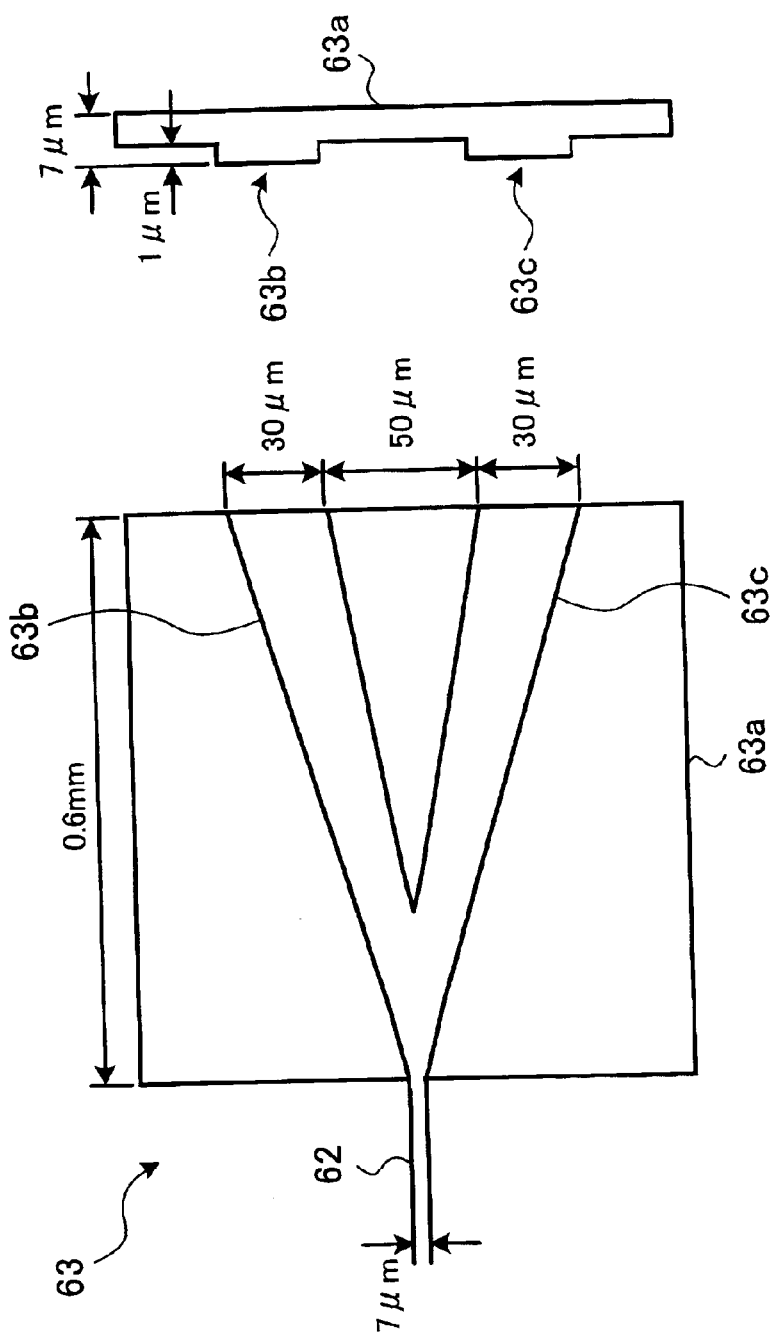
FIGS. 15(A) and 15(B) are views showing a third example of a design for a sector slab waveguide, FIG. 15(A) being a plan view of the sector slab waveguide, FIG. 15(B) being a cross-sectional view of a core at the exit.

FIGS. 15(A) and 15(B) are views showing a third example of a design for a sector slab waveguide. FIG. 15(A) is a plan view of this sector slab waveguide and FIG. 15(B) is a cross-sectional view of a core at the exit.

A sector slab waveguide 63 shown in FIGS. 15(A) and 15(B) is suitable for a waveguide type optical coupler. An optical input waveguide 62 including one waveguide is connected to the entrance of the sector slab waveguide 63.

Moreover, two guide waveguides 63b and 63c are formed by changing the thickness of portions of a core 63a.

As shown in FIG. 15(A), the sector slab waveguide 63 comprises a waveguide including the square core 63a each side of which has a length of 0.6 mm. The guide waveguides 63b and 63c are formed so that they will branch off radially at an end where the optical input waveguide 62 is connected and so that they will extend straight to the exit. The width of each of the guide waveguides 63b and 63c is 7 µm at the entrance, gradually widens in the direction of the output side, and is 30 µm at the exit. The width at the entrance of each of the guide waveguides 63b and 63c is the same as that of a core in the optical input waveguide 62. At the exit there is an interval of 50 µm between the guide waveguides 63b and 63c. As shown in FIG. 15(B), the maximum thickness of the core 63a is 7 µm. Moreover, areas in the core 63a where the guide waveguides 63b and 63c are formed and the other areas in the core 63a differ in thickness by 1 µm.

Figure 16:
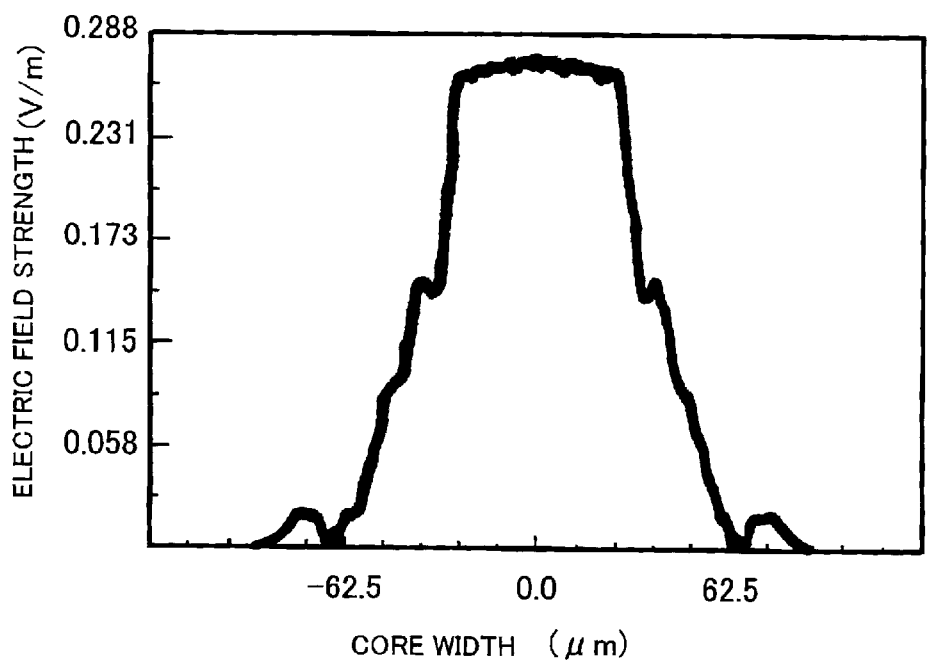
FIG. 16 is a graph showing the shape of a mode of optical signal generated in the third example of a design for the sector slab waveguide.
Figure 17:
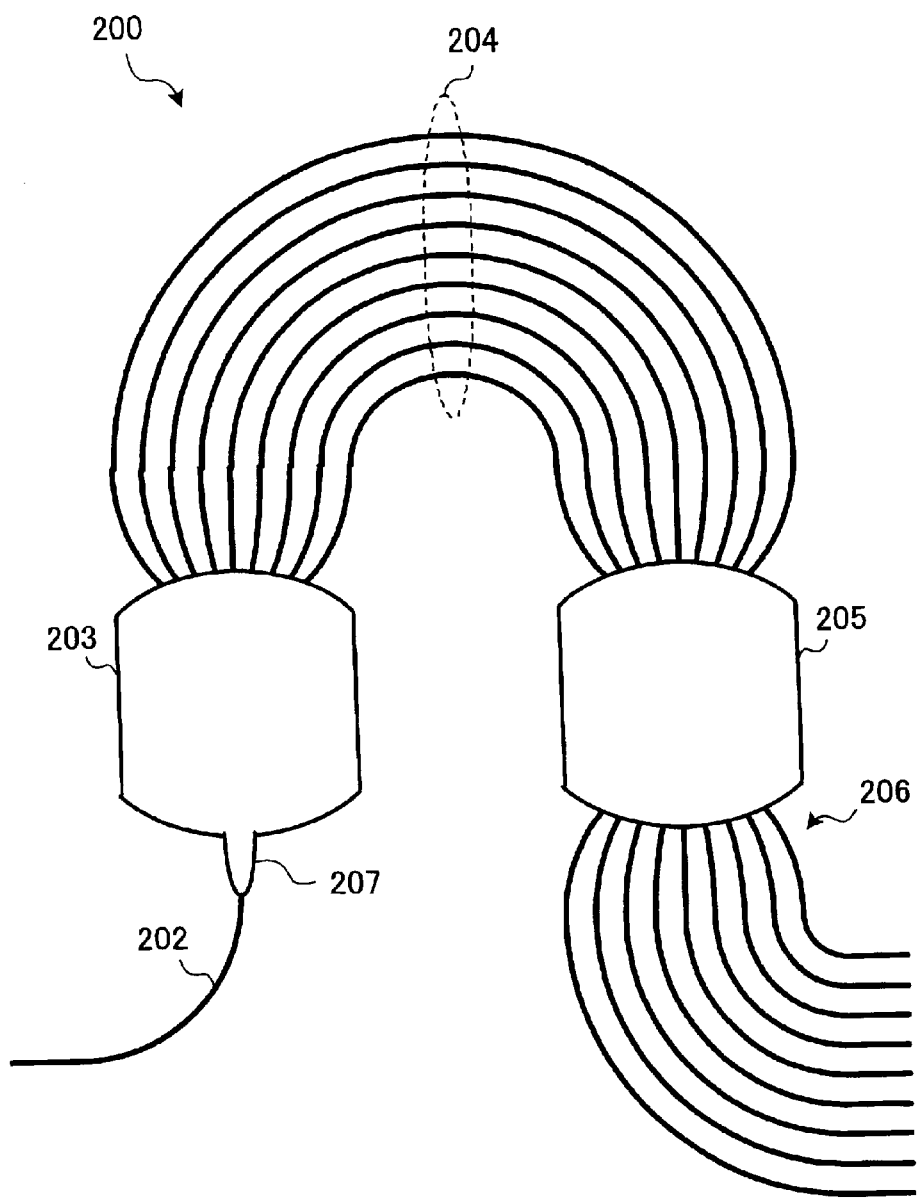
FIG. 17 is a view showing the structure of a conventional arrayed waveguide grating.
Figures 19A, 19B:
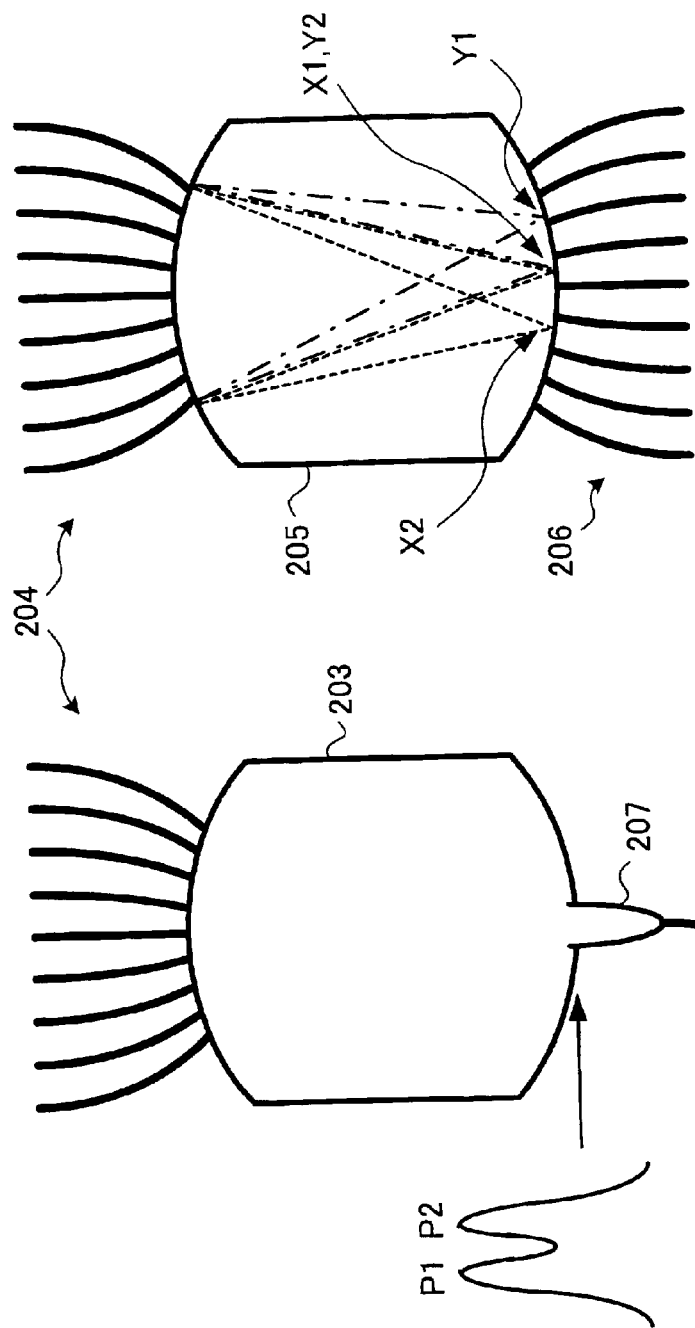
FIGS. 19(A) and 19(B) are schematic views showing how optical signal output from the mode conversion waveguide propagates through the arrayed waveguide grating, FIG. 19(A) showing how optical signal output from the mode conversion waveguide propagates through portions around a sector slab waveguide on the input side, FIG. 19(B) showing how optical signal output from the mode conversion waveguide propagates through portions around a sector slab waveguide on the output side.
Figure 20:
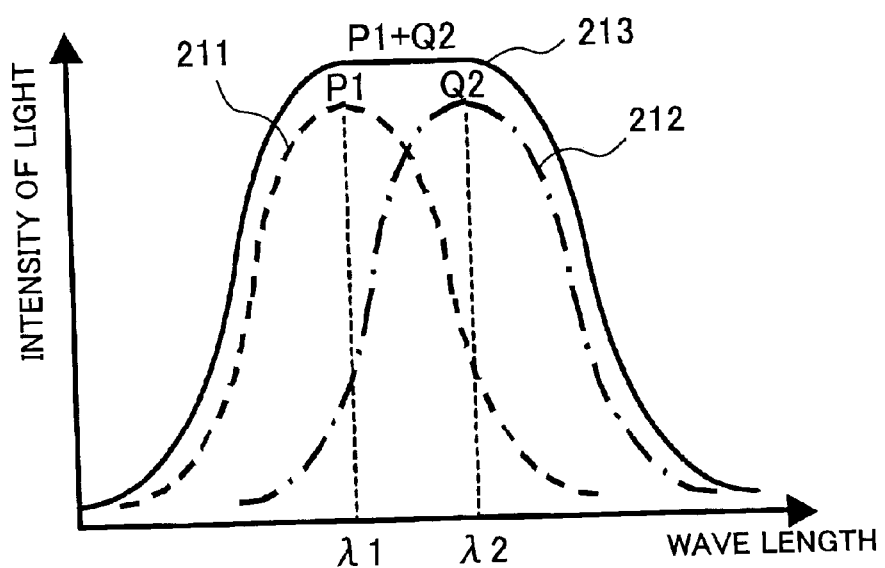
FIG. 20 is a graph for describing the passband characteristic of optical signal in an optical output waveguide.
Figure 21:
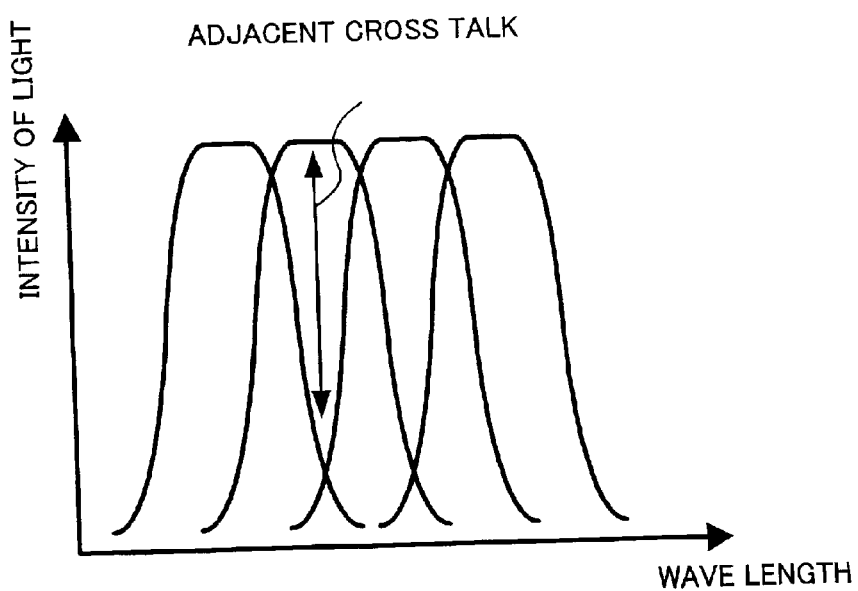
FIG. 21 is a graph of passband characteristics for describing how cross talk occurs.

FIG. 16 is a graph showing the shape of a mode of optical signal generated in the above third example of a design for a sector slab waveguide.

A graph in FIG. 16 shows the shape at the exit of the sector slab waveguide 63 of a mode of optical signal input from the above optical input waveguide 62. In this example, a wave-form having a flat peak is obtained. The width of each of the guide waveguides 63b and 63c in the sector slab waveguide 63 is narrow and the guide waveguides 63b and 63c branch at a comparatively great angle. As a result, optical signal guided through these areas is weak and a peak far higher in intensity of optical signal than ones generated in surrounding areas is not generated in areas of the guide waveguides 63b and 63c. On the other hand, the intensity of optical signal which is radiated from the entrance without undergoing mode conversion does not lower significantly. Therefore, optical signal having the shape of a mode of which is flat between peaks is generated.

If such optical signal is generated, it is possible to make the intensity of optical signal at the exit of the sector slab waveguide 63 uniform across its width. As a result, a high-performance waveguide type optical coupler that can spread input optical signal as signal of uniform intensity is formed.

As has been described in the foregoing, with the optical multiplexer/demultiplexer according to the present invention, by forming guide waveguides in the first sector slab waveguide, a peak corresponding to the shape of the guide waveguides will appear in the shape of a mode of input optical signal with the propagation of the input optical signal. Therefore, the shape of a mode of optical signal which propagates can be controlled accurately and more proper passband characteristics can be obtained in the optical output waveguides.

Furthermore, with the waveguide type optical coupler according to the present invention, by forming guide waveguides in the sector slab waveguide, a peak corresponding to the shape of the guide waveguides will appear in the shape of a mode of input optical signal with the propagation of the input optical signal. Therefore, the shape of a mode of optical signal which propagates can be controlled accurately and optical signal of uniform intensity can be output to each of output waveguides connected to the output side.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical multiplexer/demultiplexer comprising:

one or more optical input waveguides;

a first sector slab waveguide connected to an output side of the one or more optical input waveguides, the first sector slab waveguide comprising a core and a plurality of guide waveguides formed in the core, each guide waveguide having an effective refractive index that is greater than an effective refractive index of areas of the core not within each guide waveguide, the guide waveguides branching at a center of curvature of the first sector slab waveguide and extending from an edge of an input side to an edge of the output side of the first sector slab waveguide without intersecting one another;

an arrayed waveguide connected to an output side of the first sector slab waveguide and having a plurality of waveguides to propagate an output optical signal, any two adjacent waveguides differing in length by a constant value, the width of each of the guide waveguides being greater than a distance between a center of any two adjacent waveguides of the arrayed waveguide at the output side of the first sector slab waveguide;

a second sector slab waveguide connected to an output side of the arrayed waveguide; and a plurality of optical output waveguides connected to an output side of the second sector slab waveguide.

2. The optical multiplexer/demultiplexer according to claim 1, wherein if the number of the optical input waveguides is one, the width of each of the plurality of guide waveguides is greater than or equal to that of a core in the optical input waveguide.

3. The optical multiplexer/demultiplexer according to claim 1, wherein if the number of the optical input waveguides is two or more, the width of each of the plurality of guide waveguides is greater than or equal to that of an area containing cores of the two or more optical input waveguides.

4. The optical multiplexer/demultiplexer according to claim 1, wherein the width of each of the plurality of guide waveguides is constant or gradually widens in a direction from the input side to the output side of the first sector slab waveguide.

5. The optical multiplexer/demultiplexer according to claim 1, wherein each of the plurality of guide waveguides is formed by increasing a thickness of the core of the first sector slab waveguide corresponding to each respective guide waveguide.

6. The optical multiplexer/demultiplexer according to claim 1, wherein the plurality of guide waveguides are formed by doping respective portions of the core of the first sector slab waveguide using an additive that increases a refractive index of the respective portions.

7. The optical multiplexer/demultiplexer according to claim 6, wherein Ge or Ti is used as the additive.

8. The optical multiplexer/demultiplexer according to claim 1, wherein the plurality of guide waveguides are formed by doping, using an additive that lowers a refractive index, areas of the core of the first sector slab waveguide where the plurality of guide waveguides are not formed.

9. The optical multiplexer/demultiplexer according to claim 1, further comprising tapered waveguides at ends of the one or more optical input waveguides where the one or more optical input waveguides connect to the first sector slab waveguide, wherein a width of a core of each of the tapered waveguides gradually widens or narrows in a direction toward the first sector slab waveguide.

10. The optical multiplexer/demultiplexer according to claim 1, further comprising a mode conversion waveguide located at an end of the one or more optical input waveguides connecting to the first sector slab waveguide, wherein the mode conversion waveguide is shaped as a symmetrical paraboloid with a width of a core of the mode conversion waveguide widening in a direction toward the first sector slab waveguide.

11. The optical multiplexer/demultiplexer according to claim 1, further comprising a tapered waveguide at respective ends of each of the plurality of waveguides of the arrayed waveguide where the waveguides connect to the first sector slab guide, wherein a width of a core of each tapered waveguide gradually widens or narrows in a direction toward the first sector slab waveguide.

12. An optical coupler comprising a sector slab waveguide connected at an input side to one or more optical input waveguides and connected at an output side to a plurality of optical output waveguides, the sector slab waveguide spreading an optical signal input from the one or more optical input waveguides to the plurality of optical output waveguides, the sector slab waveguide comprising a core and a plurality of guide waveguides formed in the core, each guide waveguide having an effective refractive index that is greater than an effective refractive index of areas of the core not within each guide waveguide guide waveguides branching at a center of curvature of the sector slab waveguide and extending from an edge of an input side to an edge of the output side of the sector slab waveguide without intersecting one another, the width of each of the guide waveguides being greater than a distance between a center of any two adjacent optical output waveguides at the output side of the sector slab waveguide.

13. An optical multiplexer/demultiplexer comprising:
one or more optical input waveguides;
a first sector slab waveguide connected to an output side of the one or more optical input waveguides, the first sector slab waveguide comprising a plurality of guide waveguides formed in the first sector slab waveguide, each guide waveguide having an effective refractive index that is greater than an effective refractive index of areas in the first sector slab waveguide not within each guide waveguide, each guide waveguide being formed by increasing a thickness of a clad of the first sector slab waveguide, the guide waveguides branching at a center of curvature of the first sector slab waveguide and extending from an edge of an input side to an edge of the output side of the first sector slab waveguide without intersecting one another;

an arrayed waveguide connected to an output side of the first sector slab waveguide and having a plurality of waveguides to propagate an output optical signal, any two adjacent waveguides differing in length by a constant value, the width of each of the guide waveguides being greater than a distance between a center of any two adjacent waveguides of the arrayed waveguide at the output side of the first sector slab waveguide;

a second sector slab waveguide connected to an output side of the arrayed waveguide; and a plurality of optical output waveguides connected to an output side of the second sector slab waveguide.

14. An optical coupler comprising a sector slab waveguide connected at an input side to one or more optical input waveguides and connected at an output side to a plurality of optical output waveguides, the sector slab waveguide spreading an optical signal input from the one or more optical input waveguides to the plurality of optical output waveguides, the sector slab waveguide comprising a plurality of guide waveguides, each guide waveguide having an effective refractive index that is greater than an effective refractive index of areas in the sector slab waveguide not within each guide waveguide, each guide waveguide being formed by increasing a thickness of a clad of the sector slab waveguide, the guide waveguides branching at a center of curvature of the sector slab waveguide and extending from an edge of an input side to an edge of the output side of the sector slab waveguide without intersecting one another, the width of each of the guide waveguides being greater than a distance between a center of any two adjacent optical output waveguides at the output side of the sector slab waveguide.

* * * * *

UNITED STATES PATENT AND TRADEMARK OFFICE
CERTIFICATE OF CORRECTION

PATENT NO. : 6,741,772 B2
DATED : May 25, 2004
INVENTOR(S) : Satoshi Ide

It is certified that error appears in the above-identified patent and that said Letters Patent is hereby corrected as shown below:

Column 19,
Line 29, after "guide waveguide" (first occurrence), insert -- , the --

Signed and Sealed this

Twenty-third Day of November, 2004

JON W. DUDAS
*Director of the United States Patent and Trademark Office*